US012312230B2

(12) United States Patent
Watt et al.

(10) Patent No.: US 12,312,230 B2
(45) Date of Patent: May 27, 2025

(54) SINGLE NOZZLE BEVERAGE DISPENSING

(71) Applicant: HYDRATION LABS, INC., Charlestown, MA (US)

(72) Inventors: David Watt, Charlestown, MA (US); Andrew Jaskey, Charlestown, MA (US)

(73) Assignee: HYDRATION LABS, INC., Charlestown, MA (US)

( * ) Notice: Subject to any disclaimer, the term of this patent is extended or adjusted under 35 U.S.C. 154(b) by 216 days.

(21) Appl. No.: 18/176,961

(22) Filed: Mar. 1, 2023

(65) Prior Publication Data

US 2023/0202823 A1 Jun. 29, 2023

Related U.S. Application Data

(63) Continuation of application No. PCT/US2021/048700, filed on Sep. 1, 2021.

(60) Provisional application No. 63/073,102, filed on Sep. 1, 2020.

(51) Int. Cl.
*B67D 1/00* (2006.01)

(52) U.S. Cl.
CPC .................................... *B67D 1/005* (2013.01)

(58) Field of Classification Search
CPC ........ B67D 2210/00118; B67D 1/0884; B67D 1/005; B67D 1/1272
See application file for complete search history.

(56) References Cited

U.S. PATENT DOCUMENTS

| | | | | |
|---|---|---|---|---|
| 2,502,610 A | | 4/1950 | Wegman | |
| 3,359,996 A | | 12/1967 | Cornelius | |
| 4,673,108 A | | 6/1987 | De Man | |
| 5,342,587 A | | 8/1994 | Laughlin et al. | |
| 5,601,210 A | | 2/1997 | Kelly et al. | |
| 5,803,320 A | * | 9/1998 | Cutting ................ | B67D 1/0871 222/129.1 |

(Continued)

OTHER PUBLICATIONS

International Preliminary Report on Patentability for International Application No. PCT/US2021/048700, mailed Mar. 16, 2023, 8 Pages.

(Continued)

*Primary Examiner* — Donnell A Long
(74) *Attorney, Agent, or Firm* — Bradley Arant Boult Cummings LLP; Adam J. Thompson, Esq.

(57) ABSTRACT

A nozzle for beverage dispensing. The nozzle accepts both hot water lines and cold water lines at the nozzle, where the water may be carbonated or still. Cold carbonated water is received near the top of a double cone-shaped insert within the nozzle interior. The cold carbonated water is depressurized prior to being fully exposed to atmospheric pressure by passing the cold carbonated water down and around the double cone-shape of the insert. The depressurized cold carbonated water is collected via a funnel, and is dispensed from the nozzle after exiting the funnel bottom. Hot water is received in chamber within the nozzle separate from the passageway through which the cold carbonated water flows. Both hot and cold water streams are directed to flow in a tight and narrow downward direction via flow straighteners, and the streams are mixed with flavoring after dispensing from the nozzle.

19 Claims, 15 Drawing Sheets

(56) References Cited

U.S. PATENT DOCUMENTS

| | | | | |
|---|---|---|---|---|
| 6,253,963 | B1 * | 7/2001 | Tachibana | B67D 1/0044 239/428 |
| 7,757,600 | B2 | 7/2010 | Jones et al. | |
| 2002/0066496 | A1 * | 6/2002 | Hewlitt | B67D 1/005 141/383 |
| 2005/0115989 | A1 | 6/2005 | Ludovissie et al. | |
| 2010/0024660 | A1 | 2/2010 | Wallace | |
| 2016/0130126 | A1 * | 5/2016 | Bhalerao | B67D 1/0081 239/10 |
| 2019/0039873 | A1 * | 2/2019 | Aslam | B67D 1/0048 |
| 2020/0031654 | A1 * | 1/2020 | Wing | F25D 31/003 |

OTHER PUBLICATIONS

International Search Report and Written Opinion for International Application No. PCT/US2021/048700, mailed Feb. 7, 2022, 11 Pages.

* cited by examiner

SINGLE NOZZLE BEVERAGE DISPENSING

CROSS REFERENCE TO RELATED APPLICATIONS

This application is a continuation of International Patent Application No. PCT/US21/48700, filed Sep. 1, 2021, and entitled "SINGLE NOZZLE BEVERAGE DISPENSING," which claims the priority to and the benefit of U.S. Application No. 63/073,102, filed Sep. 1, 2020, entitled "SINGLE NOZZLE BEVERAGE DISPENSING," the disclosures of which are incorporated herein by reference in their entireties.

BACKGROUND

While the appearance of conventional beverage dispensing devices has evolved slightly over time, the mechanics of the conventional beverage dispensing devices have remained largely unchanged. For example, traditional beverage dispensing devices include a plurality of nozzles, each designated to dispense its own beverage flavor. Furthermore, these nozzles only dispense hot beverages, cold beverages, still water beverages, or carbonated water beverages, as they are not equipped to dispense a collection of varying beverages of varying temperatures and varying carbonation levels.

Another flaw of conventional beverage dispensing systems, and particularly their nozzles, is the width, uniformity, and aesthetics of their dispensed streams. For example, conventional systems dispense wide or nonuniform streams of liquid that cannot be accepted by small-necked bottles, and instead only by wide-mouthed containers like traditional beverage cups, or the like. Furthermore, traditional beverage dispensing devices must be adjusted and tuned based on the host location's water pressure. Adjusting a traditional beverage dispensing device is often costly, time consuming, and problematic if a host location's water pressure is either too weak, or too strong. The water pressure for a host location can vary over time or be incorrectly adjusted requiring additional tuning and adjustment.

Therefore, there exists a long-felt but unresolved need for improved beverage dispensing via a single nozzle.

BRIEF SUMMARY OF DISCLOSURE

Briefly described, and in various embodiments, the present disclosure relates to single nozzle beverage dispensing. Specifically, the present disclosure relates to a beverage dispensing nozzle through which one or more beverages may be dispensed, regardless if the beverage is flavored or unflavored, carbonated or still, or hot, cold, or ambient (hot and cold mixed).

As used herein, "cold" can generally refer to a temperature range of 36-38 degrees Fahrenheit (F) for still liquids (non-carbonated) and 38-40 degrees F. for carbonated liquids. As used herein, "hot" can generally refer to a temperature range of 88-90 degrees F. As used herein, "ambient" can generally refer to a temperature range of 65-75 degrees F. In particular embodiments, the temperature ranges discussed herein are temperatures measured at the container after dispensing. In some embodiments, "cold" can refer to water between 32 degrees F. and 50 degrees F., "ambient" can refer to water between 51 degrees F. and 79 degrees F., and "hot" can refer to water between 80 degrees F. and 212 degrees F. In other embodiments, the temperature ranges for "cold," "ambient," and "hot" can be defined as any subsets of the aforementioned ranges. In some embodiments, the temperature ranges can be defined by a user for a beverage dispenser based on user preference.

In various embodiments, aspects of the present disclosure relate to a beverage dispenser nozzle operable to accommodate multiple water streams of different temperatures, which each flow through a single and common flavor path. For example, the exemplary nozzle discussed herein accommodates both still water and carbonated water in both hot and cold temperatures. In some embodiments, the nozzle can dispense still water as both hot and cold temperatures, while dispensing carbonated water in cold temperatures. Furthermore, one or more flavors (e.g., syrups, natural flavors/additives, etc.) may be added to the dispensed water for creating one or more flavored beverages. Unlike conventional flavored beverage dispensers, aspects of the present disclosure allow for a dispensed stream to be narrow and straight, such that it may be received through a small necked bottle (or the like).

In one embodiment, internal components of the exemplary nozzle include a substantially double cone-shaped insert around which carbonated (or still) fluid (e.g., water) flows prior to being dispensed. In particular embodiments, the double cone-shaped insert (also referred to herein as "the insert" or "the torpedo") is positioned within a cavity of a reciprocal conical shape, and where an outer wall of the cavity conforms to the shape of the insert and creates a space of a constant width (and of a particularly high tolerance) between the outer surface of the insert and the cavity wall. In one embodiment, the constant width is limited to a first cone of the double cone corresponding to a source of the fluid, where the width between the outer surface of the insert and the cavity wall may increase from proximal end to the distal end of the second cone. According to various aspects of the present disclosure, to ensure optimal beverage carbonation, the nozzle is configured to lower the pressure of a carbonated water stream prior to being dispensed. In at least one embodiment, the insert is tapered to a point at both ends of the insert, and linearly increases in width to about the middle of the insert length. In other embodiments, the width may taper in a non-linearly manner (e.g., the taper slope may be greater closer to the middle of the insert length), and the end (e.g., a distal end) may taper to various shapes for facilitating optimal beverage dispensing, such as a flat surface, or a rounded surface, for allowing a beverage to flow over and around the end in a tight flow. In particular embodiments, as the insert width increases, the cavity wall also increases proportionally in width, such that the spacing between the cavity wall and the insert remains constant. Accordingly, as the carbonated water flows through the spacing between the insert and the cavity wall, the pressure decreases with respect to the increase in insert diameter, as the volume through which the water can flow also increases. According to one embodiment, the width of space between the insert and cavity wall remains constant, thus preventing bubbles in the carbonated water from combining and creating not only larger bubbles, but also a wider stream of dispensed beverage.

In at least one embodiment, enclosed around the bottom portion of the insert is an insert funnel or water collection channel. In various embodiments, the insert funnel is wide-mouthed at the upper portion of the funnel for accepting the bottom half of the insert, which, once positioned within the funnel, extends about half the length of the funnel. In certain embodiments, the funnel collects the depressurized water after it flows around the upper portion of the insert and forms a narrow stream of water prior to being dispensed. In particular embodiments, a spacing between the insert funnel and the bottom half of the insert gradually increases towards the bottom end of the insert, for allowing the depressurized water to slow and stabilize prior to being dispensed as the water enters the water collection channel. According to various aspects of the present disclosure, the funnel forms a narrow stream of water via its tapered funnel shape, which becomes increasingly narrower towards the bottom of the funnel. Furthermore, as water flows between the funnel inner wall and the insert, the water may encounter flow straighteners, or "fins" (not shown in the present embodiment, but discussed in greater detail below), protruding from the insert which direct the fluid flow in a downward direction. The straighteners can prevent the fluid from spiraling around nozzle (e.g., which may precipitate a turbulent, wide stream flow that may cause spillage).

In certain embodiments, enclosed around the funnel is the bottom portion of the nozzle's outer casing, or shell. According to various aspects of the present disclosure, the bottom portion of the nozzle's outer casing is also substantially funnel-shaped, for accommodating the funnel enclosing the insert. In various embodiments, a hot water line attaches to the nozzle's outer casing, and the space between the outer casing and the funnel acts as a hot water chamber through which the hot water is received and then directed to flow in a downward direction. For example, in some embodiments, to prevent hot water from congregating around the mouth of the hot water line and creating a turbulent body of water inside the nozzle after being received into the hot water chamber (as the hot water may be received from a horizontal direction at substantial pressures), the nozzle outer casing is shaped to include (or shaped as to form) a hot water flow diverter. In at least one embodiment, the hot water flow diverter is a pocket located proximate to the hot water line for providing a volume for received hot water to occupy prior to being forced down the nozzle (via gravity). In further embodiments, the hot water flow diverter located proximate to the hot water line can disrupt the input hot water to prevent water from being concentrated in one particular area or side of the casing (which may lead to hot water being dispensed at an angle). In certain embodiments, the flow diverter and/or the funnel may include outwardly protruding flow straighteners, which (in some embodiments) resemble vertically aligned fins that restrict horizontally flowing water into a downward direction.

In at least one embodiment, as the hot and/or cold water is dispensed through the bottom portion of the nozzle, the stream(s) may encounter one or more external flow straighteners. In particular embodiments, the external flow straighteners resemble "teeth," or the like, which point inwardly and at an acute angle from the nozzle bottom for catching any flow from a dispensed stream that may still be traveling with horizontal velocity. Accordingly, the flow straighteners redirect a dispensed beverage flow that is not being dispensed in a straight and narrow stream. In some embodiments, the flow straightener's teeth-like form factor reduces dripping, as any liquid on the surface of the flow straighteners falls easily off the pointed end.

In certain embodiments, one or more flavor lines are coupled to the nozzle at a location proximate to the flow straighteners or otherwise proximate to the nozzle mouth. According to various aspects of the present disclosure, each of the flavor lines may be configured to dispense one or more user-selected flavors, which may include additives (e.g., sugar, caffeine, vitamins, syrups, etc.), into the dispensed water stream, thus combining with the water stream as it is received into the user's beverage container. In at least one embodiment, each flavor line defines a flavor dispenser that dispenses a flavor concentrate into the water stream. The nozzle can include a plurality of holsters configured to retain each of a plurality of flavor dispensers. Each of the plurality of holsters can align with a nozzle aperture through which flavor concentrate enters the nozzle and contacts a fluid stream there within.

In some embodiments, the exemplary nozzle may be installed at a beverage dispensing device that includes a display (e.g., touchscreen display, or the like), one or more servers (remote or local) operatively connected to the beverage dispensing device, and a mobile application and/or web platform accessible by a user via his/her mobile computing device. In at least one embodiment, the beverage dispensing device may generate and display a digital graphic including encoded information (e.g., a QR code, barcode, etc.), where the encoded information may include at least a unique identifier corresponding to the dispensing device, as well as instructions for directing a user to a web page, mobile application, or another appropriate digital environment for interfacing with the beverage dispensing device. For example, in at least one embodiment, the user may capture the digital graphic with a camera coupled to his/her mobile computing device (e.g., take a picture, orient the graphic to be in the camera's field of view, etc.), which in response causes the mobile computing device to prompt the user to navigate to a web page based on the data encoded in the graphic, or to open a mobile application based on the graphic. In various embodiments, and via the web page or mobile application, the user may select from a beverage menu including one or more beverage flavors, temperatures, carbonation levels, etc., which the system may then dispense through the exemplary nozzle.

According to various aspects of the present disclosure, in response to navigating to the web page or mobile application corresponding to the graphic, the user is presented with a graphical user interface resembling, or mirroring, that of the display on the beverage dispensing device. In certain embodiments, the system establishes a Web Socket Secure (WSS) connection, or the like, between the mobile computing device and the beverage dispensing device (and/or server operatively connected to the beverage dispensing device). Accordingly, in particular embodiments, the user may control the beverage dispensing device via his/her mobile computing device. For example, in various embodiments, if a user were to select a particular beverage configuration on his/her mobile computing device, not only would the selections be received and registered by the beverage dispensing device, but any selections made on the mobile computing device would be replicated, or mirrored, onto the beverage dispensing device display.

In one embodiment, the connection (or dispensing session) between a user's mobile computing device and the beverage dispensing device terminates under various conditions. For example, the session may end after 20 seconds of inactivity. In other embodiments, the user may select to disconnect from the beverage dispensing device. In a particular embodiment, if the user navigates away from the web page or mobile application, the session may be terminated. In at least one embodiment, the beverage dispensing device may detect a Bluetooth signal (or another appropriate signal) from the mobile computing device. The session may terminate if the Bluetooth signal is no longer detectable (e.g., if the user walks away from the beverage dispensing device).

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF FIGURES

Figure 1:
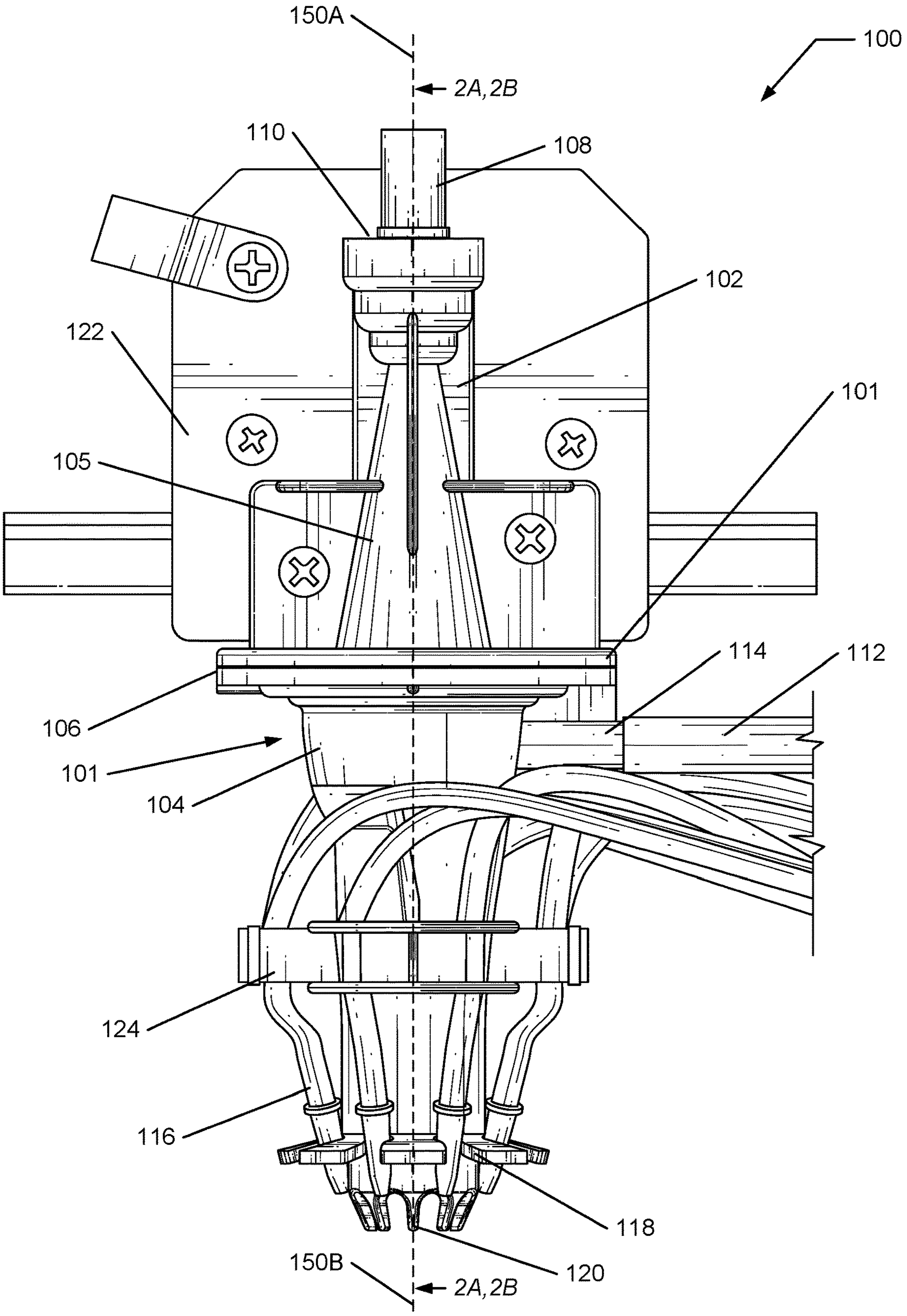
FIG. 1 shows a perspective view of an exemplary nozzle system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

Briefly described, and in various embodiments, the present disclosure relates to a beverage dispenser nozzle operable to accommodate multiple water streams of different temperatures, which each flow through a single and common flavor path. For example, the exemplary nozzle discussed herein accommodates both still water and carbonated water in both hot and cold temperatures. Furthermore, one or more flavors (e.g., syrups, natural flavors/additives, etc.) may be added to the dispensed water for creating one or more flavored beverages. Unlike conventional flavored beverage dispensers, aspects of the present disclosure allow for a dispensed stream to be narrow and straight, such that it may be received through a small necked bottle (or the like).

In one embodiment, internal components of the exemplary nozzle include a substantially double cone-shaped insert around which carbonated (or still) water flows prior to being dispensed. In particular embodiments, the double cone-shaped insert (also referred to herein as "the insert" or "the torpedo") is positioned within a cavity of a reciprocal conical shape, and where an outer wall of the cavity conforms to the shape of the insert and creates a space of a constant width (and of a particularly high tolerance) between the outer surface of the insert and the cavity wall. According to various aspects of the present disclosure, to ensure optimal beverage carbonation, the nozzle is configured to lower the pressure of a carbonated water stream prior to being dispensed. In at least one embodiment, the insert is tapered to a point at both ends of the insert, and linearly increases in width to about the middle of the insert length. In other embodiments, the width may not taper linearly (e.g., the tapered slope may be greater closer to the middle of the insert length), and the end (e.g., a distal end) may taper to various shapes for facilitating optimal beverage dispensing, such as a flat surface, or a rounded surface, for allowing a beverage to flow over and around the end in a tight flow. In particular embodiments, as the insert width increases, the cavity wall also increases proportionally in width, such that the spacing between the cavity wall and the insert remains constant. Accordingly, as the carbonated water flows through the spacing between the insert and the cavity wall, the pressure decreases with respect to the increase in insert diameter, as the volume through which the water can flow also increases. According to one embodiment, the width of space between the insert and cavity wall remains constant, thus preventing bubbles in the carbonated water from combining and creating not only larger bubbles but also a wider stream of dispensed beverage.

In at least one embodiment, enclosed around the bottom portion of the insert is an insert funnel or water collection channel. In various embodiments, the insert funnel is wide-mouthed at the upper portion of the funnel for accepting the bottom half of the insert, which, once positioned within the funnel, extends about half the length of the funnel. In certain embodiments, the funnel collects the depressurized water after it flows around the upper portion of the insert and forms a narrow stream of water prior to being dispensed. According to various aspects of the present disclosure, the funnel forms a narrow stream of water via its tapered funnel shape, which becomes increasingly narrower towards the bottom of the funnel. Furthermore, as water flows between the funnel inner wall and the insert, the water may encounter flow straighteners, or "fins" (not shown in the present embodiment, but discussed in greater detail below), protruding from the insert which direct the water flow in a downward direction.

In certain embodiments, enclosed around the funnel is the bottom portion of the nozzle's outer casing or shell. According to various aspects of the present disclosure, the bottom portion of the nozzle's outer casing is also substantially funnel-shaped for accommodating the funnel enclosing the insert. In various embodiments, a hot water line attaches to the nozzle's outer casing, and the space between the outer casing and the funnel acts as a hot water chamber through which the hot water is received and then directed to flow in a downward direction. For example, in some embodiments, to prevent hot water from congregating around the mouth of the hot water line and creating a turbulent body of water inside the nozzle after being received into the hot water chamber (as the hot water may be received from a horizontal direction at substantial pressures), the nozzle outer casing is shaped to include (or shaped as to form) a hot water flow diverter. In at least one embodiment, the hot water flow diverter is a pocket located proximate to the hot water line for providing a volume for received hot water to occupy prior to being forced down the nozzle (via gravity). In further embodiments, the hot water flow diverter located proximate to the hot water line can disrupt the input hot water to prevent water from being concentrated in one particular area or side of the casing (which may lead to hot water being dispensed at an angle). In certain embodiments, the flow diverter and/or the funnel may include outwardly protruding flow straighteners, which (in some embodiments) resemble vertically aligned fins that direct horizontally flowing water into a downward direction.

In at least one embodiment, as the hot and/or cold water is dispensed through the bottom portion of the nozzle, the stream(s) may encounter one or more external flow straighteners. In particular embodiments, the external flow straighteners resemble "teeth," or the like, which point inwardly and at an acute angle from the nozzle bottom for catching any flow from a dispensed stream that may still be traveling with horizontal velocity. Accordingly, the flow straighteners redirect a dispensed beverage flow that is not being dispensed in a straight and narrow stream. In some embodiments, the flow straightener's teeth-like form factor reduces dripping, as any liquid on the surface of the flow straighteners falls easily off the pointed end.

In certain embodiments, one or more flavor lines are coupled to the nozzle at a location proximate to the flow straighteners or otherwise near the nozzle mouth. According to various aspects of the present disclosure, each of the flavor lines may be configured to dispense one or more user-selected flavors into the dispensed water stream, thus combining with the water stream as it is received into the user's beverage container. In some embodiments, the exemplary nozzle may be installed at a beverage dispensing device that includes a display (e.g., touchscreen display, or the like), one or more servers (remote or local) operatively connected to the beverage dispensing device, and a mobile application and/or web platform accessible by a user via his/her mobile computing device. For example, the exemplary nozzle may be installed at a beverage dispensing device similar to the device discussed in PCT Patent Application PCT/US2021/044290 entitled "Touchless Beverage Dispensing," and filed on Aug. 3, 2021 and U.S. Provisional Patent App. No. 63/0110,464, entitled "Touchless Beverage Dispensing," and filed on Aug. 3, 2020, the disclosure of which are incorporated by reference herein as if the same were set forth in their entirety herein. In at least one embodiment, the beverage dispensing device may generate and display a digital graphic including encoded information (e.g., a QR code, barcode, etc.), where the encoded information may include at least a unique identifier corresponding to the dispensing device, as well as instructions for directing a user to a web page, mobile application, or another appropriate digital environment for interfacing with the beverage dispensing device. For example, in at least one embodiment, the user may capture the digital graphic with a camera coupled to his/her mobile computing device (e.g., take a picture, orient the graphic to be in the camera's field of view, etc.), which in response causes the mobile computing device to prompt the user to navigate to a web page based on the data encoded in the graphic or to open a mobile application based on the graphic. In various embodiments, and via the web page or mobile application, the user may select from a beverage menu including one or more beverage flavors, temperatures, carbonation levels, etc., which the system may then dispense through the exemplary nozzle.

According to various aspects of the present disclosure, in response to navigating to the web page or mobile application corresponding to the graphic, the user is presented with a graphical user interface resembling, or mirroring, that of the display on the beverage dispensing device. In certain embodiments, the system establishes a Web Socket Secure (WSS) connection, or the like, between the mobile computing device and the beverage dispensing device (and/or server operatively connected to the beverage dispensing device). Accordingly, in particular embodiments, the user may control the beverage dispensing device via his/her mobile computing device. For example, in various embodiments, if a user were to select a particular beverage configuration on his/her mobile computing device, not only would the selections be received and registered by the beverage dispensing device, but any selections made on the mobile computing device would be replicated, or mirrored, onto the beverage dispensing device display.

In one embodiment, the connection (or dispensing session) between a user's mobile computing device and the beverage dispensing device terminates under various conditions. For example, the session may end after 20 seconds of inactivity (e.g., or another suitable period, such as 1 minute, 5 minutes, etc.). In other embodiments, the user may select to disconnect from the beverage dispensing device. In a particular embodiment, if the user navigates away from the web page or mobile application, the session may be terminated. In at least one embodiment, the beverage dispensing device may detect a Bluetooth signal (or another appropriate signal) from the mobile computing device, and the session may terminate if the Bluetooth signal is no longer detectable (e.g., if the user walks away from the beverage dispensing device).

Exemplary Embodiments

FIG. 1 shows a perspective view of an exemplary beverage dispensing system 100, according to one embodiment. In various embodiments, the exemplary beverage dispensing system 100 may be installed in beverage dispensing systems, such as carbonated and flavored water dispensers, soda machines, or other fluid dispensers. The beverage dispensing system 100 may replace preexisting nozzles to retrofit beverage dispensing systems or installed into new beverage dispensing systems. As discussed above, the exemplary beverage dispensing system 100 improves upon conventional beverage dispensing nozzles by allowing for hot and cold fluids, still and carbonated fluids, as well as flavored and unflavored fluids, or any combination thereof, to each be dispensed from the beverage dispensing system 100 while conventional beverage dispensing systems require multiple nozzles for dispensing the same beverage options. The beverage dispensing system 100 can include a nozzle 101 (see also FIGS. 7-10) that can be configured for connection to a cold water line 108, a hot water line 112, and one or more external flavor lines 116. The beverage dispensing system 100 can include a line guide 124 configured to attach to the nozzle 101 and affix the one or more external flavor lines 116 to the nozzle 101.

The nozzle 101 can include an outer shell 105 (e.g., or other casing) that includes one or more hose ends or similar receptacles for accepting one or more fluid lines. In some embodiments, the outer shell 105 is referred to as a "nozzle body." In one or more embodiments, the outer shell 105 includes the top portion 102 and the bottom portion 104. In at least one embodiment, the top portion 102 is fluid tight affixed to the inner nozzle portion 203 at a first radius and fluid tight affixed to the bottom portion 104 at a second radius that exceeds the first radius.

The outer shell 105 can define a conical wall that forms a cavity for receiving a portion of an insert 202 (see FIG. 2). The outer shell 105 (e.g., and/or an insert portion received thereby) can include an aperture for receiving fluid from the cold water line 108. The fluid received from the cold water line 108 can include still water, carbonated water, etc. The outer shell 105 can be mountable/securable to additional hardware (e.g., via screws or other affixing methods) within a beverage dispensing system. The outer shell 105 can include or be configured to receive the line guide 124 for affixing and positioning the one or more external flavor lines 116. The outer shell 105 can house internal nozzle components for dispensing streams of beverages. For both carbonated and still beverages and regardless of whether one or more flavors are dispensed, the streams may be tight and uniform, meaning that fluid does not flow outside of an intended flow path. Further, the streams may be narrow such that a radius of the stream does not exceed a radius of an aperture to dispense the beverage.

In certain embodiments, the outer shell 105 may be a single and unitary casing. In other embodiments, the outer shell 105 may include multiple parts/modules that may be secured together. The outer shell 105 can include a top portion 102 and a bottom portion 104. The two portions 102, 104 may be securely attached at the location 106. The top portion 102 and bottom portion 104 can be attached via any suitable attachment mechanism, or combination thereof, including but not limited to adhesives, fixtures, snap fittings, press fittings, welds, luer lock fittings, gaskets, O-rings, or other locking mechanisms. In one example, the top portion 102 and bottom portion 104 are attached via spin welding along a plane (e.g., a plane defined at location 106). As used herein, spin welding may generally refer to a technique of joining two or more components along a common plane by rotating a first component relative to a second component and, while maintaining rotation, forcing the first and second components together. In various embodiments, the two portions may be securely attached such that the portions 102, 104 maintain a waterproof seal under pressurized conditions. In at least one embodiment, manufacturing the shell 105 as separate components can allow for easier and more efficient cleaning of the nozzle 101 and internal components thereof.

In at least one embodiment, the one or more water lines may be received at the nozzle 101 by a single receiving slot, receptacle, hose connector, etc., or the nozzle may include one or more water line connections. In one or more embodiments, the nozzle 101 includes separate connections for a hot water line 112 and a cold/carbonated water line 108. In some embodiments, the nozzle 101 supports connection of additional water lines of varying temperature and/or other lines for supplying additional beverage materials (for example, a coffee line, tea line, spirit line, beer line, etc.). As shown in the present embodiment, a cold and carbonated water line 108 is received at the connector 110 and provides water at the uppermost location of the nozzle top portion 102. In a particular embodiment, a hot water line 112 is received at the connector 114 and provides water into the side of the nozzle portion 104.

As will be discussed in greater detail herein, water streams from the hot and cold water lines may combine inside the nozzle 101 and dispense out from an opening in the bottom of the nozzle 101. While being dispensed from the bottom of the nozzle 101, the dispensed water stream may be combined with one or more flavors via one or more external flavor lines 116. According to various aspects of the present disclosure, the external flavor lines 116 are secured to the bottom of the nozzle 101 via holsters 118. In various embodiments, the holster 118 position the flavor lines 116 to point slightly inward towards a dispensing water stream. In various embodiments, positioning the flavor lines 116 to point slightly inward towards a dispensing water stream allows for the flavor (e.g., a liquid, concentrate, etc.) to combine with the water stream without causing splashing or disrupting the water stream. In a particular embodiment, the flavor lines may be positioned such that the fluid from the flavor line combines with the fluid stream at an angle of at least about 5 degrees, or about 5-30 degrees, 5-10 degrees, 10-15 degrees, 14 degrees, 15-20 degrees, 20-25 degrees, or 25-30 degrees, or less than about 30 degrees. The flavor lines 116 shown in the present embodiment includes eight individual flavor lines, although any number of flavor lines may be secured to the beverage dispensing system 100 and the holsters 118.

In various embodiments, the beverage dispensing system 100 and associated components may be manufactured from a variety of materials, such as steel, aluminum, plastic, composite materials, etc. In at least one embodiment, materials with none or very few nucleation sites are preferred for manufacturing portions of the nozzle 101 that interact with carbonated water, as these materials may discourage (e.g., or at least avoid encouraging) the formation of unwanted carbon dioxide bubbles.

In at least one embodiment, as the hot and/or cold water is dispensed through the bottom portion 104 of the nozzle 101, the stream(s) may encounter one or more external flow straighteners 120. In particular embodiments, the external flow straighteners 120 resemble "teeth," or the like, which point inwardly and at an acute angle from the nozzle bottom for catching any flow from a dispensed stream that may still be traveling with horizontal velocity (e.g., outward, instead of downward in a straight and narrow stream). Accordingly, the external flow straighteners 120 can adjust a direction of at least a portion of a dispensed beverage flowing from the nozzle when the beverage is not being dispensed in a straight and narrow stream. In some embodiments, the flow straightener's teeth-like form factor reduces dripping, as any liquid on the surface of the flow straighteners falls easily off the pointed ends. The nozzle can be affixed to a cabinet of the beverage dispenser via a bracket 122. The bracket 122 can ensure the nozzle does not move during dispensing of fluids.

Figure 2A:
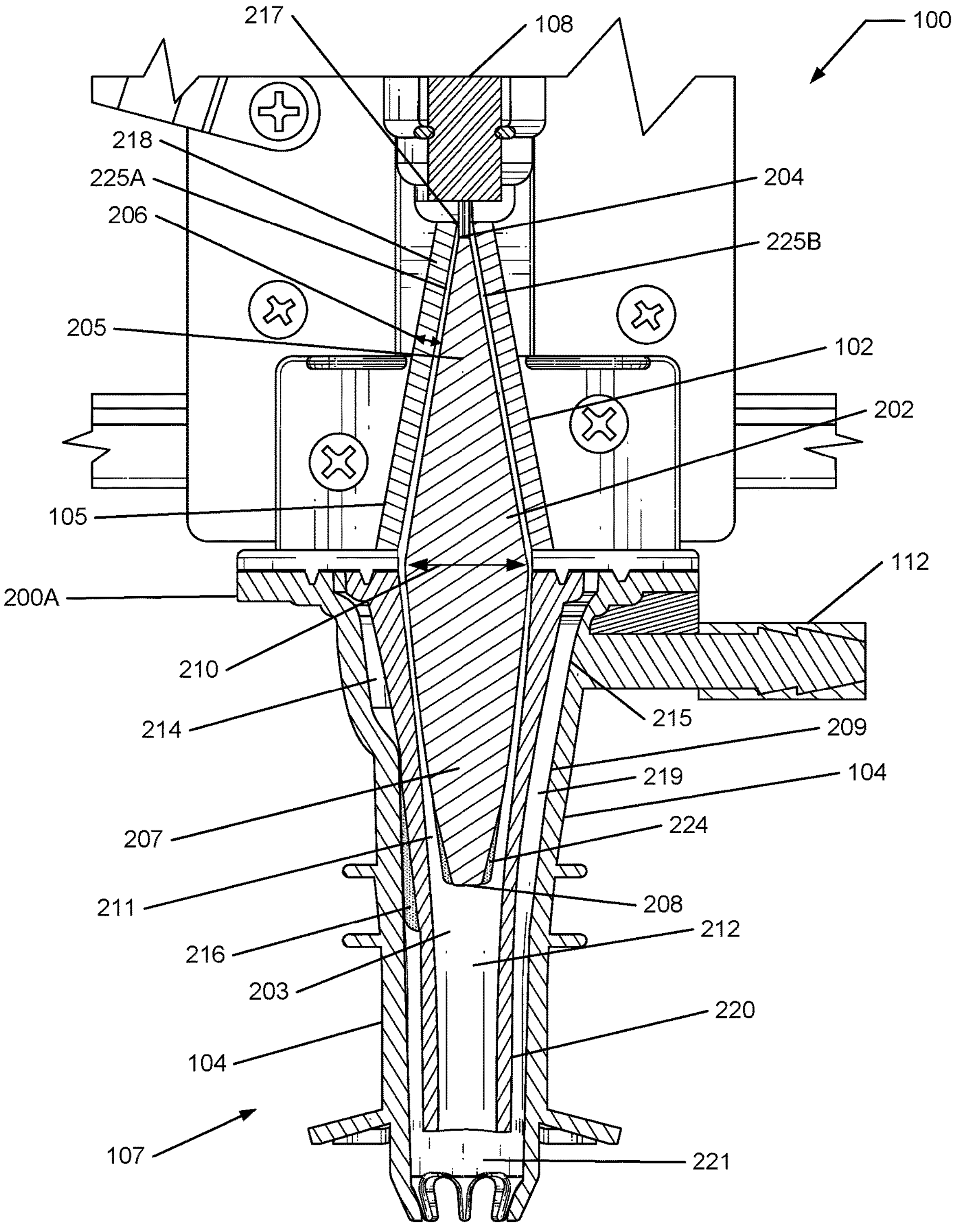
FIGS. 2A-B shows a cross-section of an exemplary nozzle system, according to one embodiment of the present disclosure.
Figure 2B:
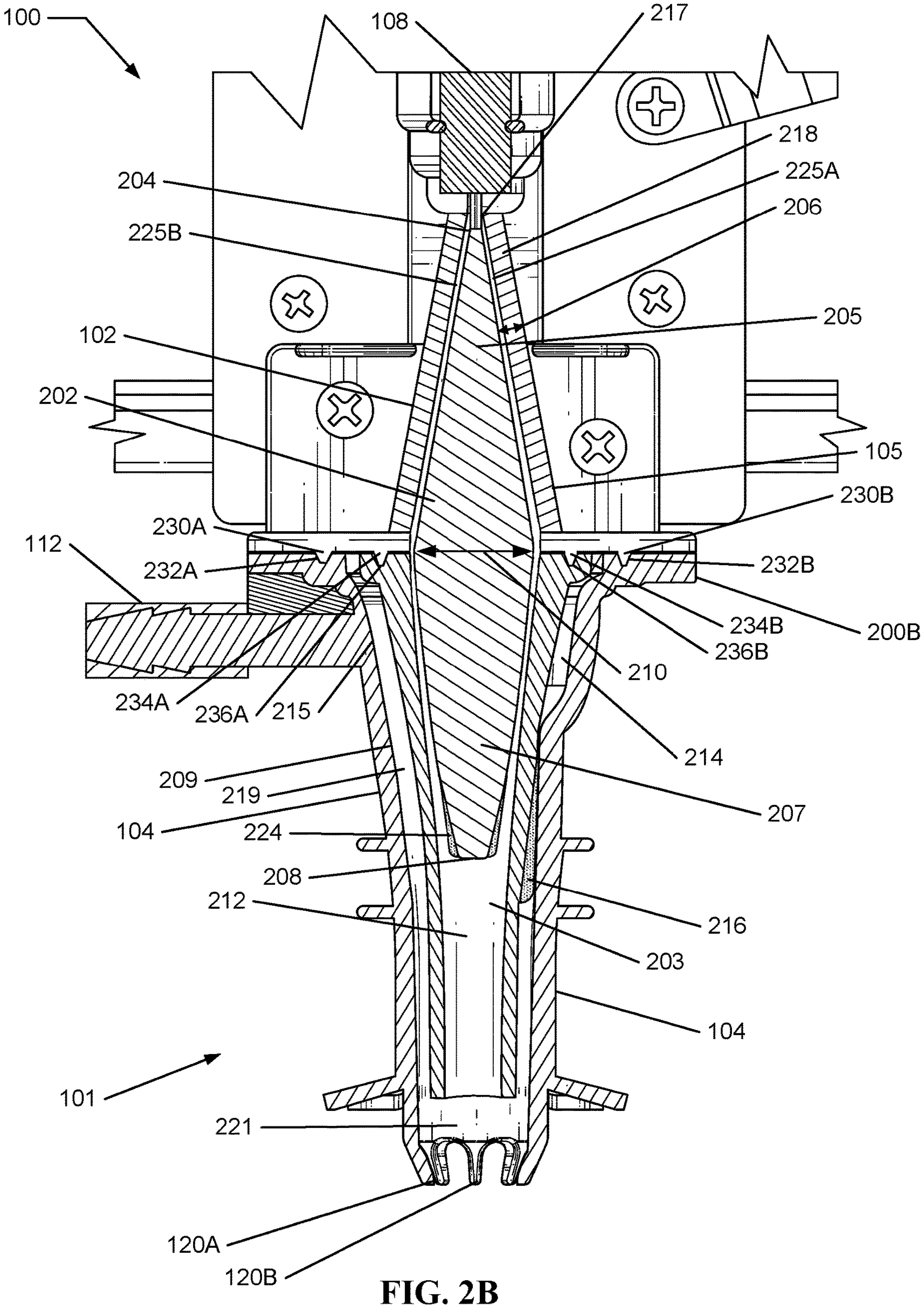

According to one embodiment, section line 150A, 150B indicates a cross-section 200A-B shown in FIGS. 2A-B.

FIG. 2A shows a cross-section 200A of the beverage dispensing system 100, according to one embodiment. In various embodiments, the cross-section 200A illustrates various internal components of the nozzle 101. In one or more embodiments, the beverage dispensing system 100 includes an insert 202 (also referred to herein as an "insert" or "torpedo"), over and around which cold and carbonated water flows. According to one embodiment, the insert 202 includes a double conical shape. In at least one embodiment, the insert 202 includes a first conical portion 205 and a second conical portion 207, the first conical portion 205 transitioning to the second conical portion 207 along a plane defined by an insert center 210. In one or more embodiments, the shell 105 (e.g., or other body defining the nozzle 101) of the top portion 102 defines a first cavity configured to receive the first conical portion 205. According to one embodiment, the top portion 102 includes a conical wall 218 that forms a first cavity for receiving the first conical portion 205.

In one or more embodiments, the bottom portion 104 (also referred to as an "outer nozzle portion") includes and/or is configured to receive an inner nozzle portion 203. In various embodiments, the bottom portion 104 includes a wall structure 209 that defines a cavity for receiving the inner nozzle portion 203 (e.g., a conical cavity or other shape that corresponds to a footprint of the inner nozzle portion 203). According to one embodiment, the inner nozzle portion 203 receives fluid from the insert 202. In various embodiments, the inner nozzle portion 203 defines a funnel 212 into which fluid is received. In one or more embodiments, a channel 219 is formed between the inner nozzle portion 203 and the wall structure 209. The channel 219 can receive fluid that passes from the hot water line 112 and into the nozzle 101. In at least one embodiment, the inner nozzle portion 203 is configured to receive the second conical portion 207 of the insert 202. In various embodiments, the inner nozzle portion 203 includes a truncated, cone-shaped inner wall 211 that defines a second cavity for receiving the second conical portion 207.

In one or more embodiments, the bottom portion 104 (also referred to as a nozzle casing, casing, or nozzle shell) includes an aperture 215 for receiving fluid from the hot water line 112. In various embodiments, the top portion 102 includes an aperture 217 for receiving fluid from the cold water line 108. In at least one embodiment, the aperture 215 is oriented perpendicular to the aperture 217. In alternate embodiments, the aperture 215 is oriented parallel to the aperture 217 or at an angular offset (e.g., 45 degrees from normal, 60 degrees from normal, or another suitable value).

In various embodiment, an uppermost tip 204 of the insert 202 is positioned into a cavity within an interior of the nozzle 101 (e.g., the shell or casing of which is reciprocally shaped to accept the cone-shaped insert 202). In particular embodiments, when positioned into the cavity, the insert 202 does not press or rest against the conical wall 218, but rather maintains a constant distance 206 from the conical wall 218, through which water dispensed from the cold water line 108 flows. The water dispensed from the cold water line 108 may or may not include carbonation. Plain water without carbonation can be referred to as "still water" as used herein. In some embodiments, a computing device coupled to the beverage dispenser can determine whether or not to dispense carbonated or still water. In other embodiments, the computing device can determine how much carbonation to add to the water. In this embodiment, when still water is selected, the carbonator may add no carbonation. In various embodiments, varying degrees of carbonation are also achieved by adding still water to a particular amount of carbonated water.

As shown in the present embodiment, the diameter of the insert 202 increases linearly from each end 204 and 208 towards about the center 210 of the insert 202. As the insert diameter increases, the conical wall 218 may proportionally increase in diameter. Accordingly, in various embodiments, the spacing 206 between the insert 202 and cavity wall remains constant within a high tolerance (e.g., a spacing width of 0.5 mm-5 mm, with a tolerance of 0.1 mm). According to various aspects of the present disclosure, the spacing 206 may range from at least about 0.2 mm, or about 0.2-1.2 mm, 0.2-0.4 mm, 0.4-0.6 mm, 0.6 mm, 0.6-0.8 mm, 0.8 mm, 0.8-1.0 mm, or 1.0-1.2 mm, or less than about 1.2 mm. In at least one embodiment, tolerances for the spacings may be about 0.127 mm. The spacing may increase to at least about 1.5 mm, or about 1.5-3.5 mm, 1.5-2.0 mm, 2.0-2.5 mm, 2.57 mm, 2.5-3.0 mm, or 3.0-3.5 mm, or less than about 3.5 mm near the insert center 210. In one embodiment, this high tolerance spacing 206 allows for the nozzle to gradually reduce the pressure of carbonated water as it is being dispensed and approaches atmospheric pressure.

According to various aspects of the present disclosure, gradually depressurizing the carbonated water by passing it over and around the insert 202 ensures that bubbles from the carbon dioxide gas do not expand and combine to form larger bubbles, as the dispensed water is confined to the space between the insert and the cavity wall. The combination of carbon dioxide bubbles (which embodiments of the disclosed nozzle uniquely avoids) can be better understood when compared to the process of opening a canister of a carbonated beverage, such as a soda. In response to opening the canister, carbon dioxide gas quickly leaves the canister (resulting in the well-known sound) and oftentimes some of the beverage escapes from the top of the canister via large bubbles. These bubbles are formed from carbon dioxide in the beverage combining and leaving the canister as the pressure within the canister reaches an equilibrium with atmospheric pressure (e.g., outside of the canister). In various embodiments, controlling this reaction that occurs when carbonated liquid approaches atmospheric pressure is at least one of the technical improvements and advantages of the disclosed nozzle over conventional beverage dispensing systems, and allows for the beverage dispensing system 100 to dispense a carbonated beverage in a tight stream and without large bubbles. Due to the inability of the carbon dioxide bubbles to combine in the nozzle 101 while passing over the insert 202, the beverage dispensing system 100 is able to achieve a greater ratio of carbon dioxide to water than when using traditional nozzles.

In at least one embodiment, in response to carbonated water flowing down and around the insert 202 and reaching the insert center point 210 (where the insert ceases to increase in diameter), the depressurized carbonated water falls down the remaining surface of the insert 202 and into a funnel 212. The spacing between the insert 202 and the funnel 212 may be constant at the insert center point 210 and begin to increase toward the bottom end 208. The increased spacing can allow the fluid to more quickly evacuate the nozzle by reducing or preventing the surface tension of the water from preventing the water from evacuating the beverage dispensing system 100 as beverage dispensing completes. The exterior of the insert 202 can include one or more flow straighteners 224 that reduce or eliminate horizontal flow velocity of the dispensed water, thereby resulting in a narrow downward stream. In one example the insert 202 includes a plurality of flow straighteners arranged radially and equidistant around the exterior thereof. According to one embodiment, as used herein, flow straightener refers to any structure or element that causes a primary force of motion of a dispensed fluid to change from hydrostatic pressure (e.g., or velocity resulting therefrom) to gravity. In one example, the flow straightener 224 includes a fin structure that tapers in width from the bottom end 208 toward the top end 204.

The insert 202 may be positioned within the upper half of the funnel 212, as the funnel 212 includes a conical shape to accommodate the substantially cone-shaped bottom portion of the insert 202. In some embodiments, the shape of the insert 202 and the funnel 212 may embody another shape having a spacing between the insert 202 and the funnel 212 that is constant, such as, for example, a pyramid, a triangular pyramid, or similar shape. In certain embodiments, the bottom portion of the insert 202 may include flow straighteners (not shown) for directing the depressurized carbonated water (or still water) to fall off the insert 202 and through the funnel 212 in a tight and narrow stream. In one embodiment, the flow straighteners protrude outwardly from the insert 202 (similar to fins) and are positioned on the insert in a vertical orientation. Accordingly, the flow straighteners reduce, or eliminate, horizontal flow velocity within a dispensing stream, and instead promote a narrow downward stream.

In various embodiments, the funnel 212 also provides a barrier between the insert 202 (around which cold carbonated and still water flows) and the inner surface of the nozzle shell/casing 104. In particular embodiments, the funnel is positioned within the nozzle casing 104 such that a vacant volume exists between the inner surface of the nozzle casing 104 and the outer surface of the funnel 212, and this vacant volume forms a hot water chamber through which hot water received from the hot water line 112 flows. In one embodiment, water from the hot water line 112 is received horizontally, and thus the flow of water needs to change from a horizontal direction to a vertical direction in order to be dispensed. According to various aspects of the present disclosure, and for reducing water turbulence in the nozzle, the nozzle casing includes a flow diverter 214 (also referred to as a "depressurizing portion") that is located on the wall structure 209 opposite the aperture 215.

In one or more embodiments, the flow diverter 214 reduces the pressure of fluid from the hot water line 112. According to one embodiment, the bottom portion 104 is configured to receive fluid via the hot water aperture 215 and depressurize the fluid via contact with the depressurizing portion. In various embodiments, the nozzle 101 includes a channel 219 defined between the inner nozzle portion 203 and the wall structure 209. In one or more embodiments, the bottom portion 104 is configured to pass the depressurized fluid through the channel 219 and dispense the depressurized fluid from the nozzle 101 via one or more nozzle outlets 221.

In certain embodiments, the flow diverter 214 is a vacant pocket/volume at about the same height on the nozzle casing 104 as the hot water line 112, and the flow diverter 214 may fill with hot water as it is received from the hot water line 112, and furthermore promote a downward stream by providing a space away from the hot water line 112 for the hot water to occupy as gravity pulls the water downward (or as the water is forced downward from the water pressure). The flow diverter 214 can facilitate normalizing the water pressure from the hot water line around a circumference of the casing 104. The water pressure from additional water entering the nozzle casing 104 can occupy the flow diverter and provide a more consistent downward force around the circumference of the casing 104. For example, hot water may enter the nozzle casing 104 with substantial pressure and horizontal velocity, and without space for the water to occupy, the water would create turbulence near the hot water line 112 and not dispense in a tight and narrow stream. The hot water may provide pressure at the point that hot water line 112 enters the casing 104, where that pressure could cause the hot water to unevenly provide water out of the nozzle 101. As such, the flow diverter 214 can provide a space for hot water to fill (if needed) as water pressure and gravity pull the hot water evenly downward through the nozzle casing 104 (or as pressure from the hot water line pushes the water downward).

The beverage dispensing system 100 can include one or more reservoirs (not shown) to store and cool or heat the water. The reservoir can include a pump configured to pump water out of the reservoir at a substantially fixed pressure. While the design of beverage dispensing system 100 enables water to be dispensed in an aesthetically pleasing stream at a variety of water pressures, the pump can minimize or eliminate an effect of pressure variance caused by a supply of water from a building. As water pressures can vary greatly based on municipality, location of a building, and a variety of other factors, other nozzles must be adjusted specifically for the pressure input into the beverage dispensing system. However, the beverage dispensing system 100 can dispense water without necessitating any adjustments because of the design of the beverage dispensing system 100 as well as the pump. By eliminating adjustments, the beverage dispensing system 100 can exclude adjustment components, be installed more quickly, reduce service calls for improper adjustment, reduce equipment necessary to perform an install, and reduce training time for technicians performing the install.

Continuing with FIG. 2A, a flow straightener 216 is shown protruding from the funnel 212 and is located beneath the flow diverter 214. As will be discussed in greater detail below in association with FIGS. 3 and 4, the flow straightener 216 is a vertically oriented "fin" protruding from the funnel 212. According to various aspects of the present disclosure, in response to water filling (at least partially) the flow diverter 214 and traveling through the space between the funnel 212 and the nozzle casing 104, the outward protrusion of the flow straightener(s) 216 further promotes a downward flow by disrupting and redirecting water flowing with a horizontal velocity.

The spacing 220 between the casing 104 and the funnel 212 can be great enough to prevent the surface tension of water from allowing water to stay back in the spacing 220. If the spacing 220 were narrower, dripping may occur after a beverage has been dispensed. Because the water that occupies the spacing 220 is from the hot water line 112, the drips could potentially burn a user of the machine (e.g., if the hot water is boiling, above 130 degrees, above 140 degrees, or 150 degrees). For safety, the spacing 220 can exceed a predetermined threshold to ensure all hot water evacuates the beverage dispensing system 100 within a predetermined time period. According to various aspects of the present disclosure, the geometries of the nozzle casing 104, funnel 212, and other nozzle components, are each designed to minimize surface tension but also facilitate efficient beverage dispensing once pressure from the water line terminates (e.g., at the end of a dispensing cycle).

FIG. 2B shows a cross-section 200B of the beverage dispensing system 100, according to one embodiment.

As discussed herein, the nozzle 101 can connect to a plurality of fluid sources via a plurality of inlets (e.g., apertures 215, 217). In one example, the aperture 217 defines a first fluid inlet configured to couple to a cold water line 108 and the aperture 215 defines a second fluid inlet configured to couple to a hot water line 112. The nozzle 101 can direct fluid flow toward one or more nozzle outlets 221, thereby defining a fluid flow axis from the top portion 102 toward the bottom portion 104. The nozzle outlet 221 can include protrusions, such as, for example, external flow straighteners 120A-B that angle toward the fluid flow axis and define a fluid outlet from which fluid exits the nozzle 101. The protrusions can define a plurality of apertures through which fluid exits the nozzle 101. For example, the external flow straighteners 120A-B define a plurality of nozzle outlets 221 from which fluid exits the nozzle 101. According to one embodiment, the fluid inlet defined by the aperture 217 is parallel to the fluid outlet of the nozzle 101. In at least one embodiment, the fluid outlet defined by the aperture 215 is perpendicular to the fluid outlet of the nozzle 101. The bottom portion 104 of the nozzle 101 can include a flow diverter 214 (also referred to as a "flow diverting pocket") for reducing a velocity of fluid from the fluid inlet defined by the aperture 215 and for inducing a directional change to the fluid flow toward the fluid flow axis. The flow diverter 214 can be oriented opposite the fluid inlet defined by the aperture 215 such that pressurized fluid traveling there through may exit and contact the flow diverter 214, thereby reducing fluid velocity and imparting a directional change toward the axis of fluid flow.

In various embodiments, the insert 202 includes a double conical shape between a first end 204 and a second end 208. The insert 202 can include a first diameter at an insert center 210, a second diameter from the inserter center 210 toward the end 204, and a third diameter from the insert center 210 toward the end 208. The first diameter can be greater than the second diameter and the third diameter. The second diameter can be greater than, less than, or equal to the third diameter. According to one embodiment, the second diameter and third diameter are substantially equal such that the channel 225A, 225B formed between the insert 202 and the conical wall 218 demonstrates a substantially constant width. As used herein, "substantially constant" may include a tolerance of +/−5% (e.g., spacing between the conical wall 218 and the insert 202 may be constant within a tolerance of +/−5%). In various embodiments, the channel 225A, 225B includes a first portion formed from a cavity between the conical wall 218 of the top portion 102 and the insert 202 and a second portion formed from a cavity between the conical wall of the inner nozzle portion 203 and the insert 202 (e.g., each channel portion demonstrating a substantially constant width).

In one example, the conical wall 218 and the insert 202 form a cavity as an increasing inner diameter toroid between the first end 204 and the insert center 206 (e.g., the cavity defining the channel 225A,225B). In this example, between at least the end 204 and the central portion 210, the diameter of the channel 225A,225B increases and the width of the channel 225A,225B remains substantially constant. In one or more embodiments, the flow straighteners 224 protrude into the channel 225A,225B and are configured to contact and direct fluid there within along the axis of fluid flow toward the one or more nozzle outlets 221. For example, each flow straightener 224 includes a protruding fin that arrests horizontal and rotational movement of fluid while preserving the fluid's vertical movement along the axis of fluid flow.

According to one embodiment, as fluid from the cold water line 108 enters the channel 225A,B, the channel 225A,B decreases the pressure of the fluid. In at least one embodiment, the substantially constant width of the channel 225A,B prevents the formation of carbon dioxide bubbles in fluid. In various embodiments, as fluid from the hot water line enters the channel 219, the flow diverter 214 contacts and decreases the pressure of the fluid. For example, the flow diverter 214 arrests horizontal movement of the fluid, thereby reducing fluid velocity and pressure while allowing vertical movement of the fluid.

In various embodiments, the top portion 102 includes rings 230A-B, 234A-B configured to fit into corresponding ring channels of the bottom portion 104 and the inner nozzle portion 203. In one or more embodiments, the bottom portion 104 includes a ring channel 232A-B that receives the ring 230A-B and the inner nozzle portion 203 includes a ring channel 236A-B that receives the ring 234A-B. The top portion 102 can be affixed to the bottom portion 104 and the inner nozzle portion 203 via spin welding in which the components are pressed together along a plane while the top portion 102 and/or the bottom portion 104 and the inner nozzle portion 103 are rotated at a high speed. According to one embodiment, the spinning motion and pressing force result in frictional forces that melt the rings 230A-B, 234A-B into the respective ring channels 232A-B, 236A-B and, thereby, secure the top portion 102 to the bottom portion 104 and the inner nozzle portion 203. In some embodiments, the top portion 102 is affixed to the bottom portion 104 via spin welding and affixed to the inner nozzle portion 203 via another technique, such as, for example, adhesives or a bayonet fitting.

Figure 3:
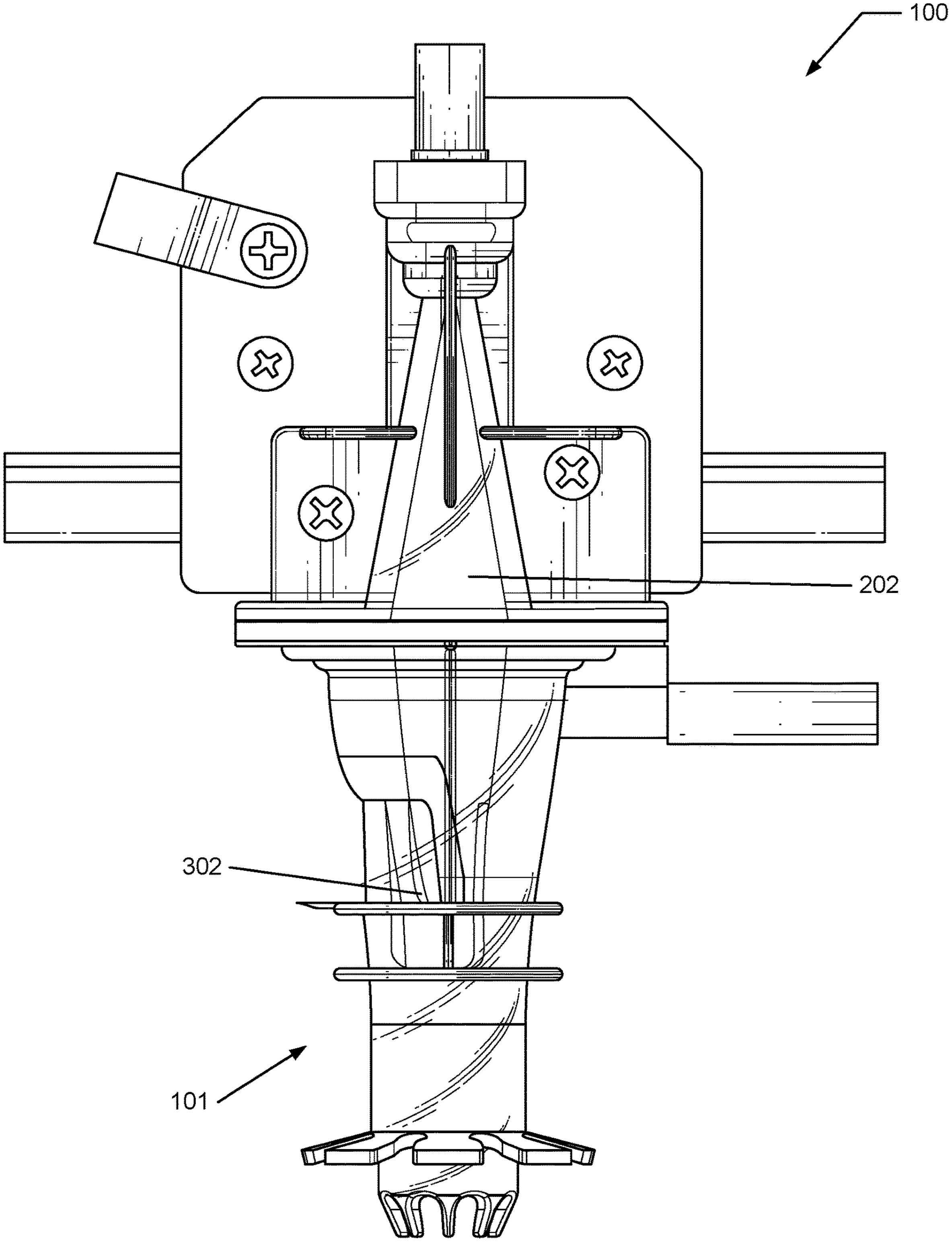
FIG. 3 shows a front view of an exemplary nozzle system, according to one embodiment of the present disclosure.
Figure 4:
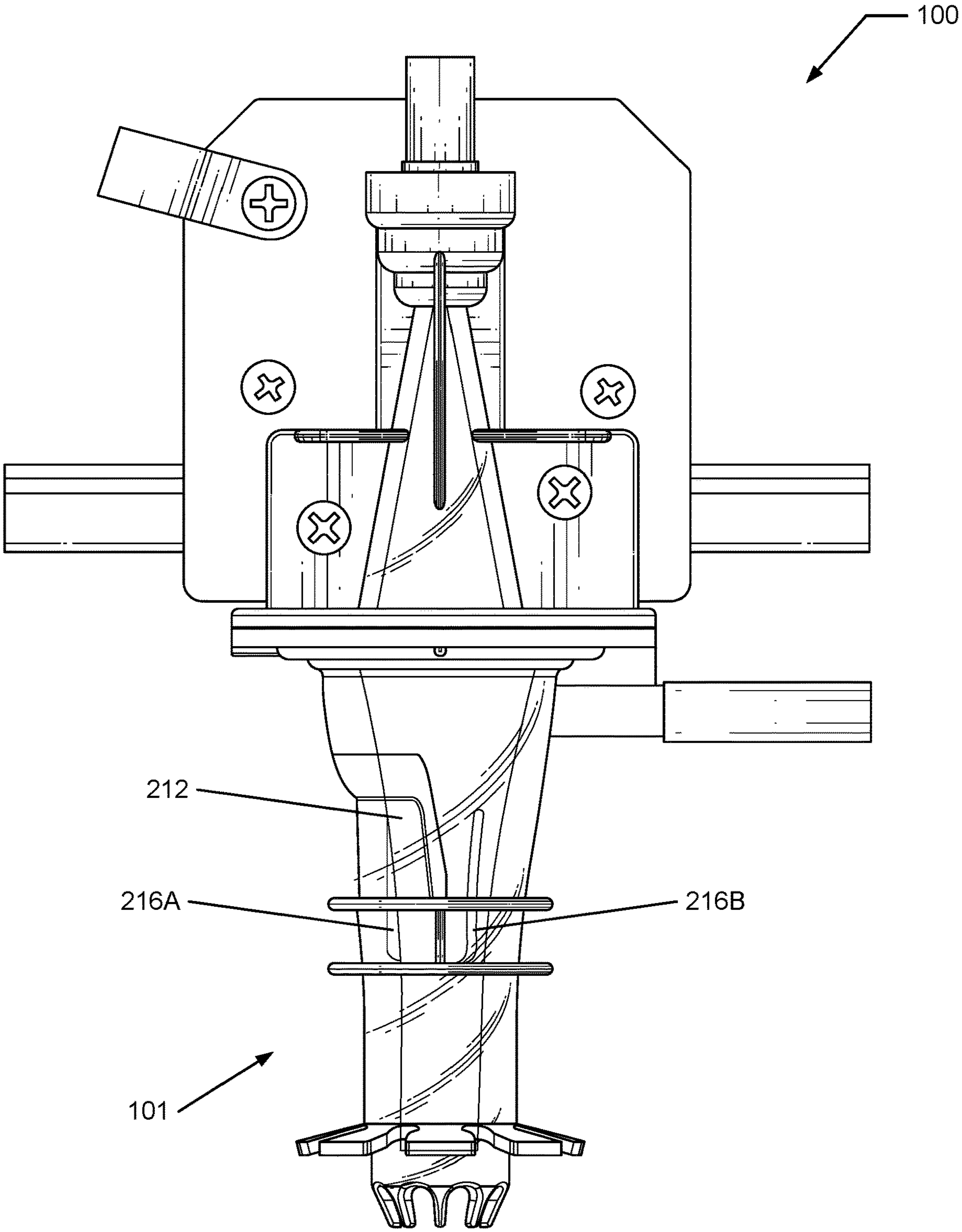
FIG. 4 shows a front view of an exemplary nozzle system, according to one embodiment of the present disclosure.

FIGS. 3-4 show front views of the beverage dispensing system 100, according to one embodiment. In one or more embodiments, at least a portion of the nozzle 101 may be transparent or translucent and, thereby, allow external observation of internal elements (e.g., which may better allow for identification of operation issues, breakage, and blockages). FIGS. 3-4 show an embodiment of the beverage dispensing system 100 in which external portions of the top portion 102 and bottom portion 104 are transparent, thereby allowing observation of various internal elements (e.g., cone-shaped insert 202, funnel 212, and flow straighteners 216A-B, 224).

As discussed above in the descriptions associated with the embodiments shown in FIGS. 1 and 2, one or more internal nozzle components may include flow straighteners for directing and promoting a downward laminar flow of water (or any appropriate fluid) through the nozzle. In certain embodiments, FIGS. 3 and 4 illustrate at least some of the nozzle's flow straighteners. Referring particularly to FIG. 3, the flow straightener 224 may promote a downward vertical flow of water in response to carbonated and/or still water flowing down and around the insert 202. Furthermore, and referring particularly to FIG. 4, flow straighteners 216A-B are shown protruding from the funnel 212. According to various aspects of the present disclosure, while the flow straighteners 216 are positioned in a substantially vertical orientation, in some embodiments the flow straighteners 216 may include a curved shape or curved/sideway orientation for promoting laminar flow of water.

Figure 5:
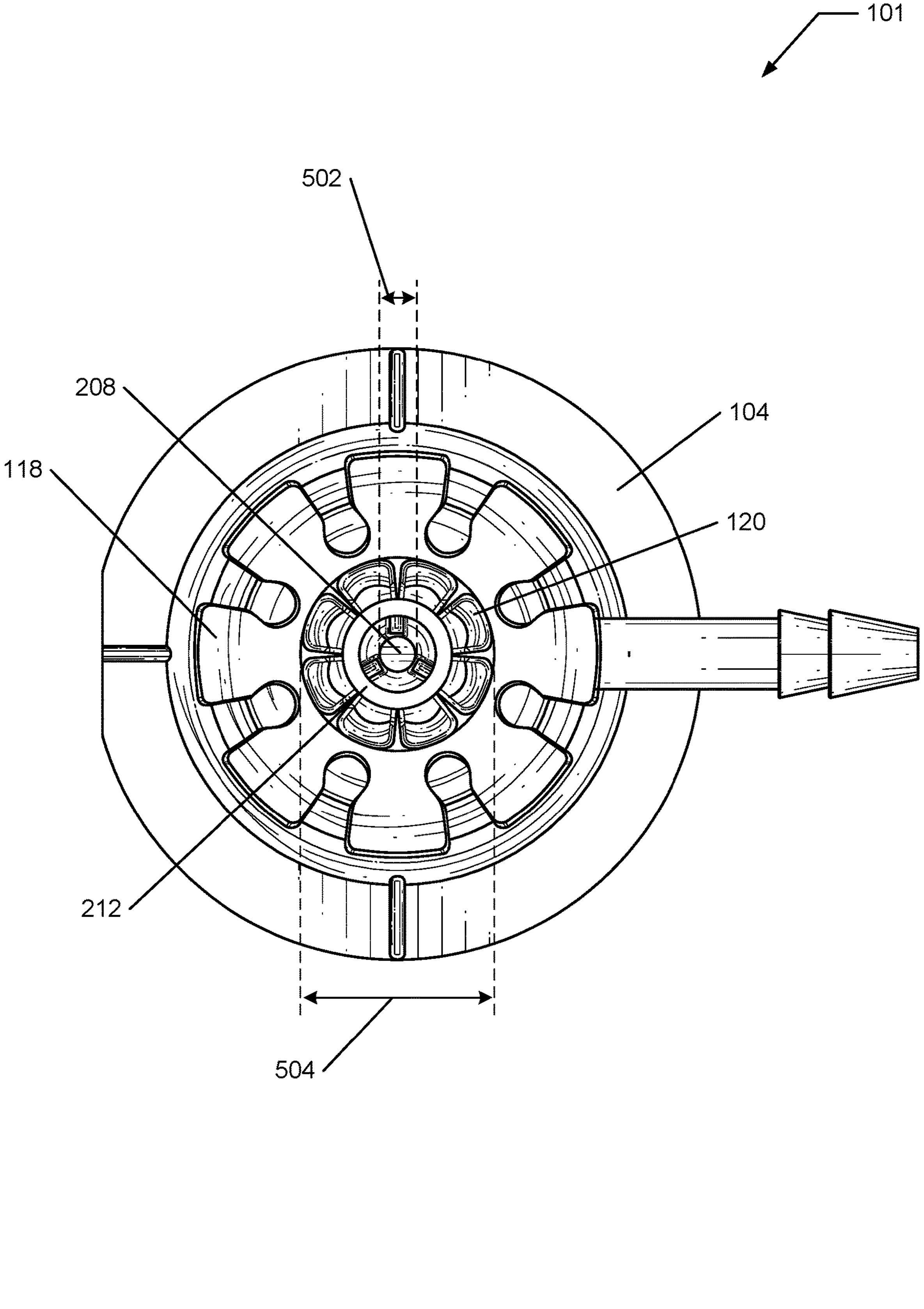
FIG. 5 shows a bottom view of an exemplary nozzle system, according to one embodiment of the present disclosure.

FIG. 5 shows a bottom view of the beverage dispensing system 100, according to one embodiment. As shown in the present embodiment, the bottom end 208 of the insert is positioned at about the center of the funnel 212 bottom opening 502, both of which are enclosed by the nozzle casing 104. Accordingly, as cold and/or carbonated water flows down the insert, the water stream may be pushed or fall off the insert bottom end 208 and through the funnel opening 502. Also shown in the present embodiment is the holsters 118 for securing the flavor lines (not shown) to the nozzle, and the external flow straighteners 120 protruding downwardly and inwardly towards the center of the nozzle opening diameter 504. According to various aspects of the present disclosure, the funnel opening 502 includes a diameter smaller than the nozzle opening diameter 504 for generating a tight and narrow stream of water that may flow freely through the opening diameter 504.

Figure 6:
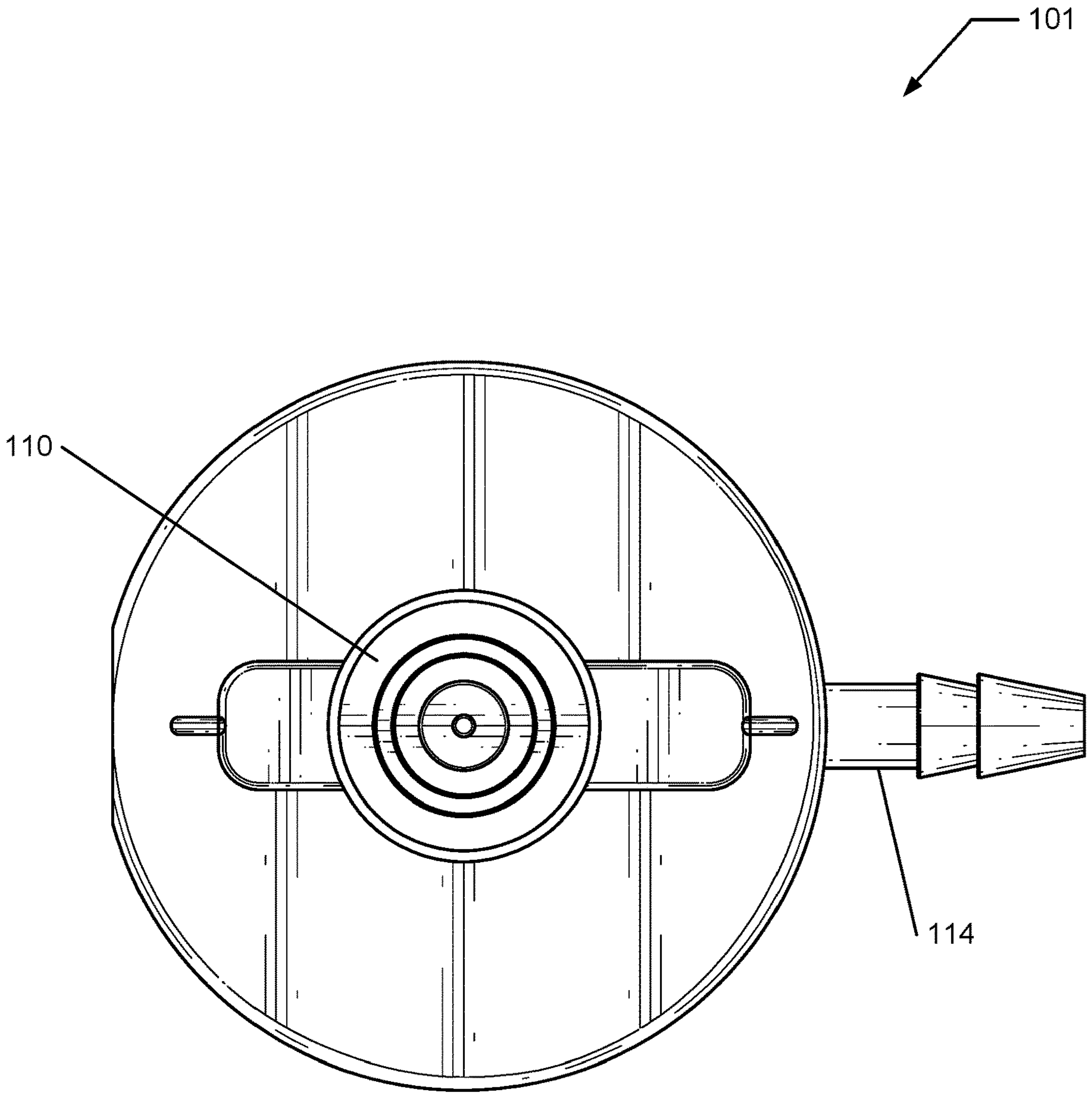
FIG. 6 shows a top view of an exemplary nozzle system, according to one embodiment of the present disclosure.

FIG. 6 shows a top view of the nozzle 101, according to one embodiment.

Figure 7:
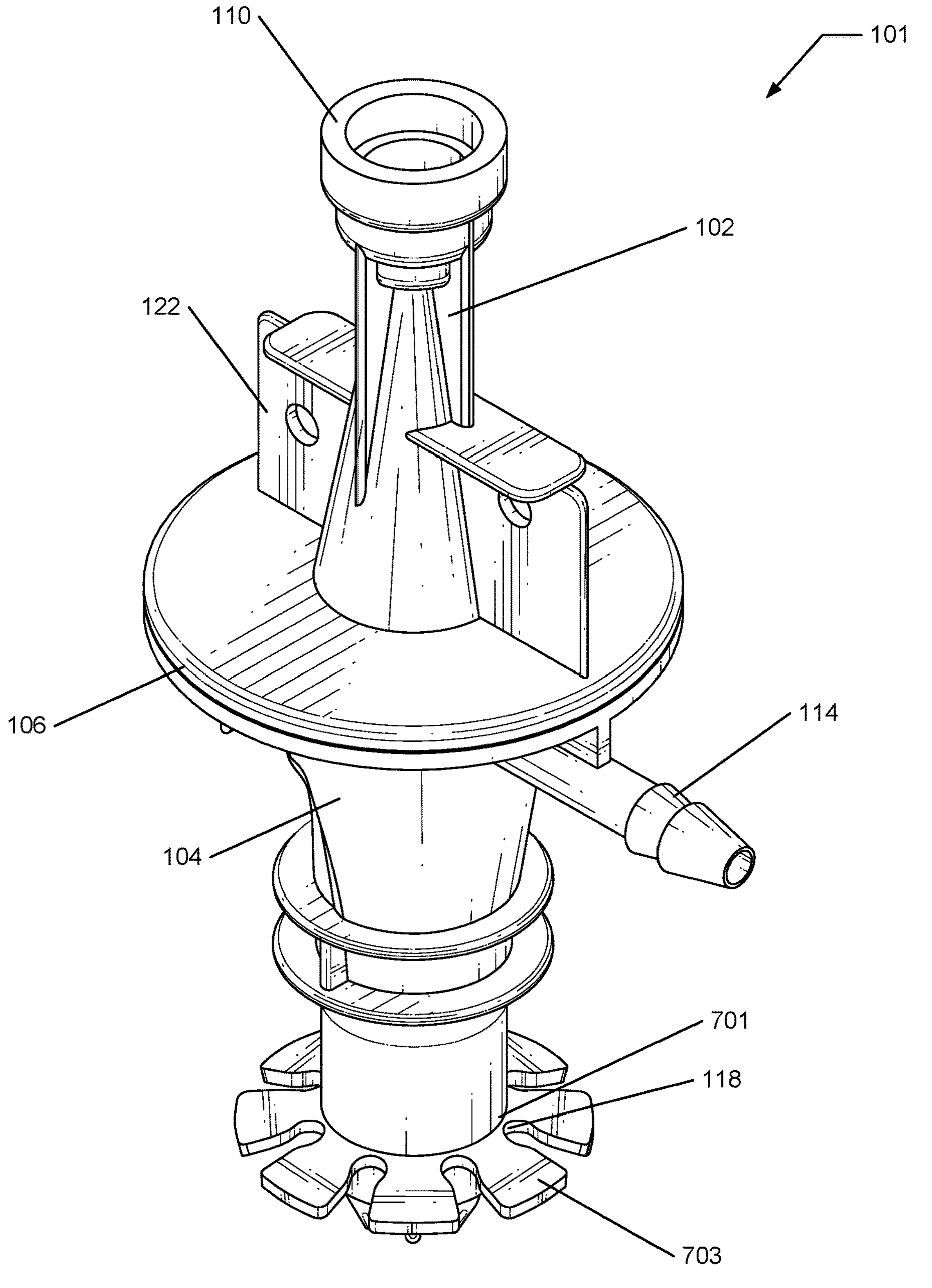
FIG. 7 shows a perspective view of an exemplary nozzle, according to one embodiment of the present disclosure.

FIG. 7 shows a perspective view of the nozzle 101, according to one embodiment of the present disclosure. In one or more embodiments, each holster 118 includes a recess formed into a tip 701 of the nozzle 101 (e.g., in particular, formed into a tab 703 that extends from the tip 701). The shape of the recess can correspond to a footprint of a flavor line intended to be secured by the holster 118. The nozzle 101 can include multiple holsters 118 of differing shape and/or dimension to accommodate flavor lines of varying size and structure. In various embodiments, the tip 701 includes a plurality of tabs 703 arranged radially and equidistant around the tip 701. In one or more embodiments, the tabs 703 separate the holsters 118 and ensure sufficient spacing to allow for observation and individual manipulation of the flavor lines affixed thereby.

Figure 8:
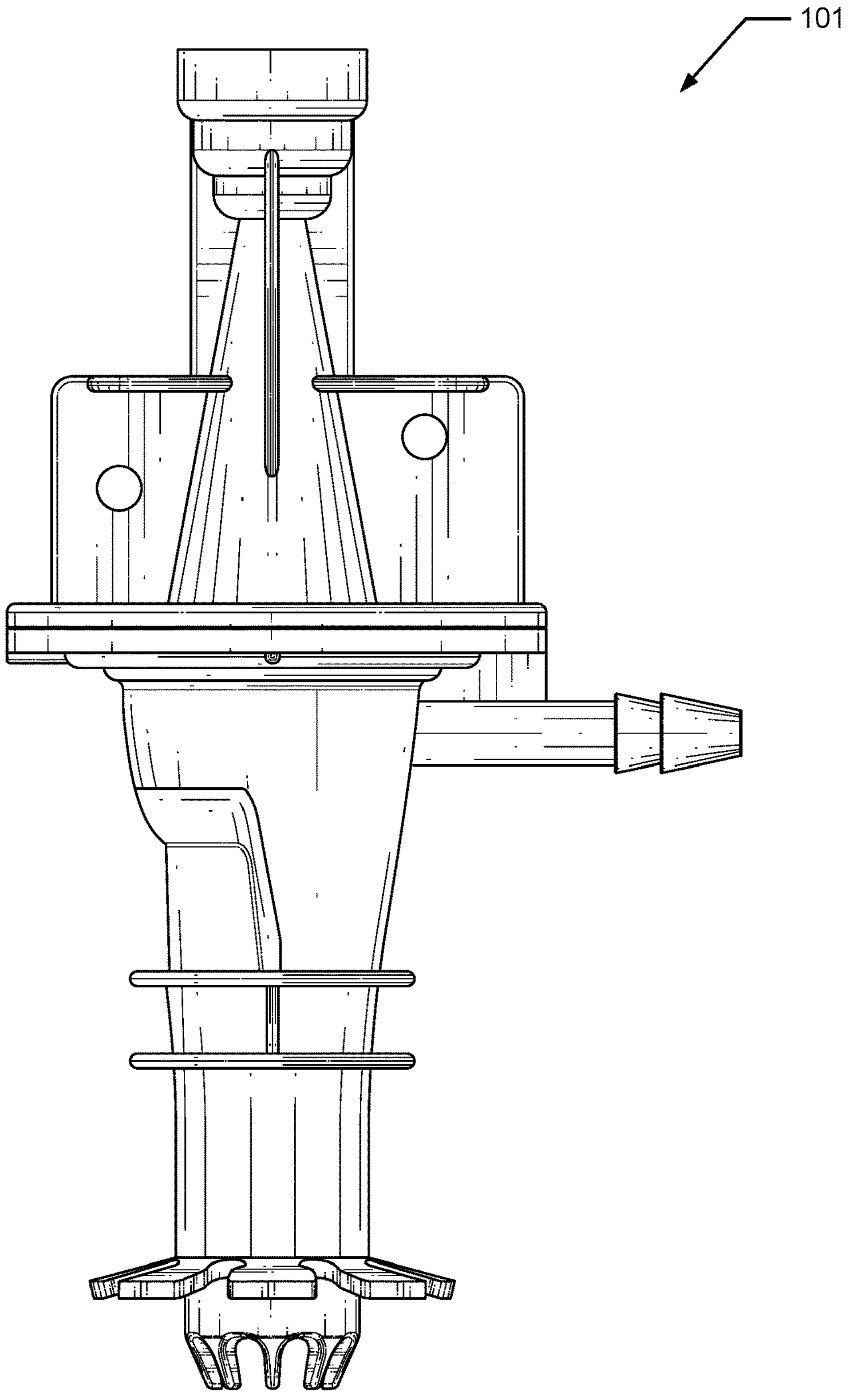
FIG. 8 shows a front view of an exemplary nozzle, according to one embodiment of the present disclosure.

FIG. 8 shows a front view of the nozzle 101, according to one embodiment of the present disclosure.

Figure 9:
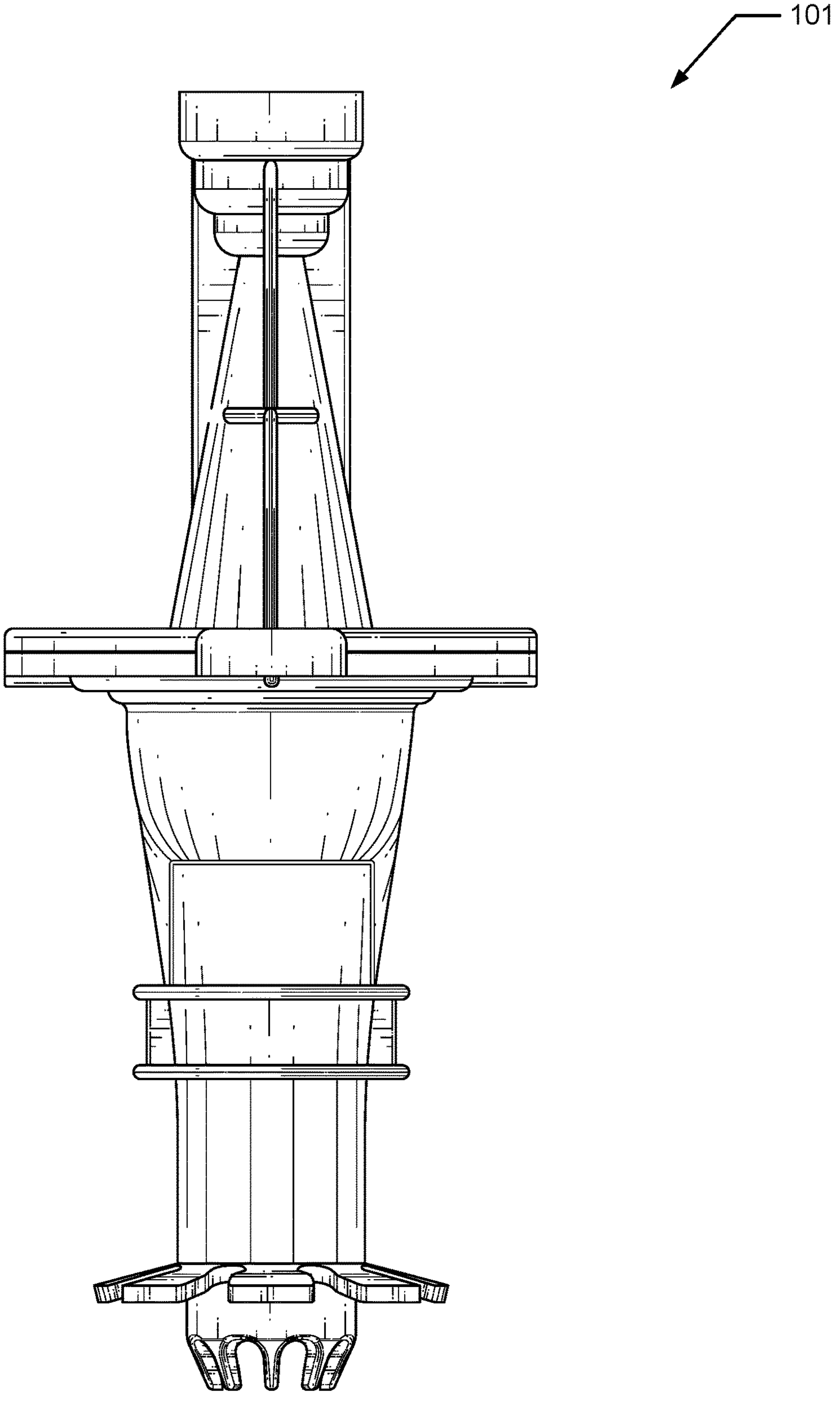
FIG. 9 shows a left side view of an exemplary nozzle, according to one embodiment of the present disclosure.

FIG. 9 shows a left side view of the nozzle 101, according to one embodiment of the present disclosure.

Figure 10:
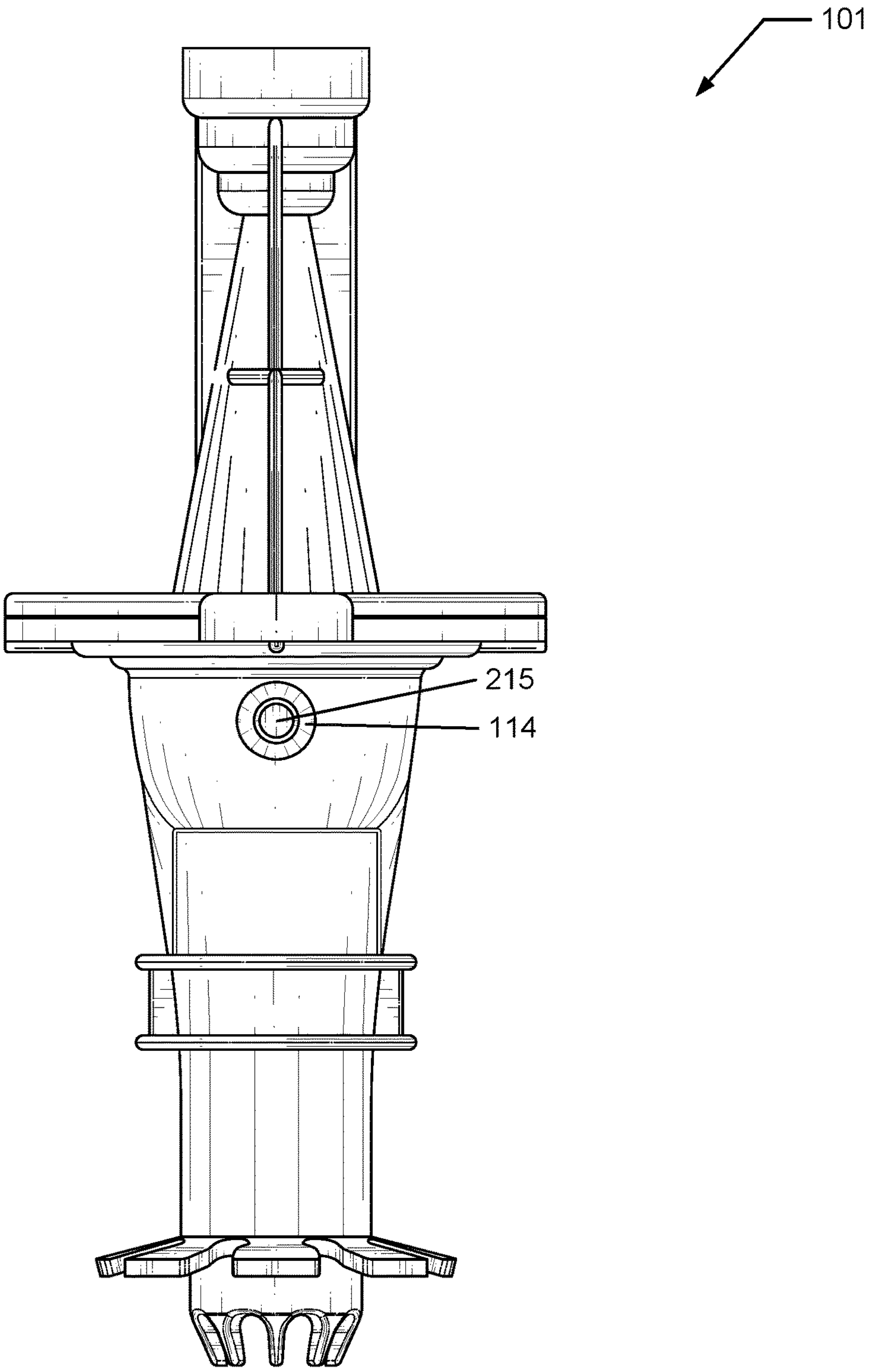
FIG. 10 shows a right side view of an exemplary nozzle, according to one embodiment of the present disclosure.

FIG. 10 shows a right side view of the nozzle 101, according to one embodiment of the present disclosure. In this embodiment, the nozzle 101 includes a hot water aperture 215 with a connector 114. The hot water supply line couples to the connector 114 and provides hot water through the aperture 215.

Figure 11:
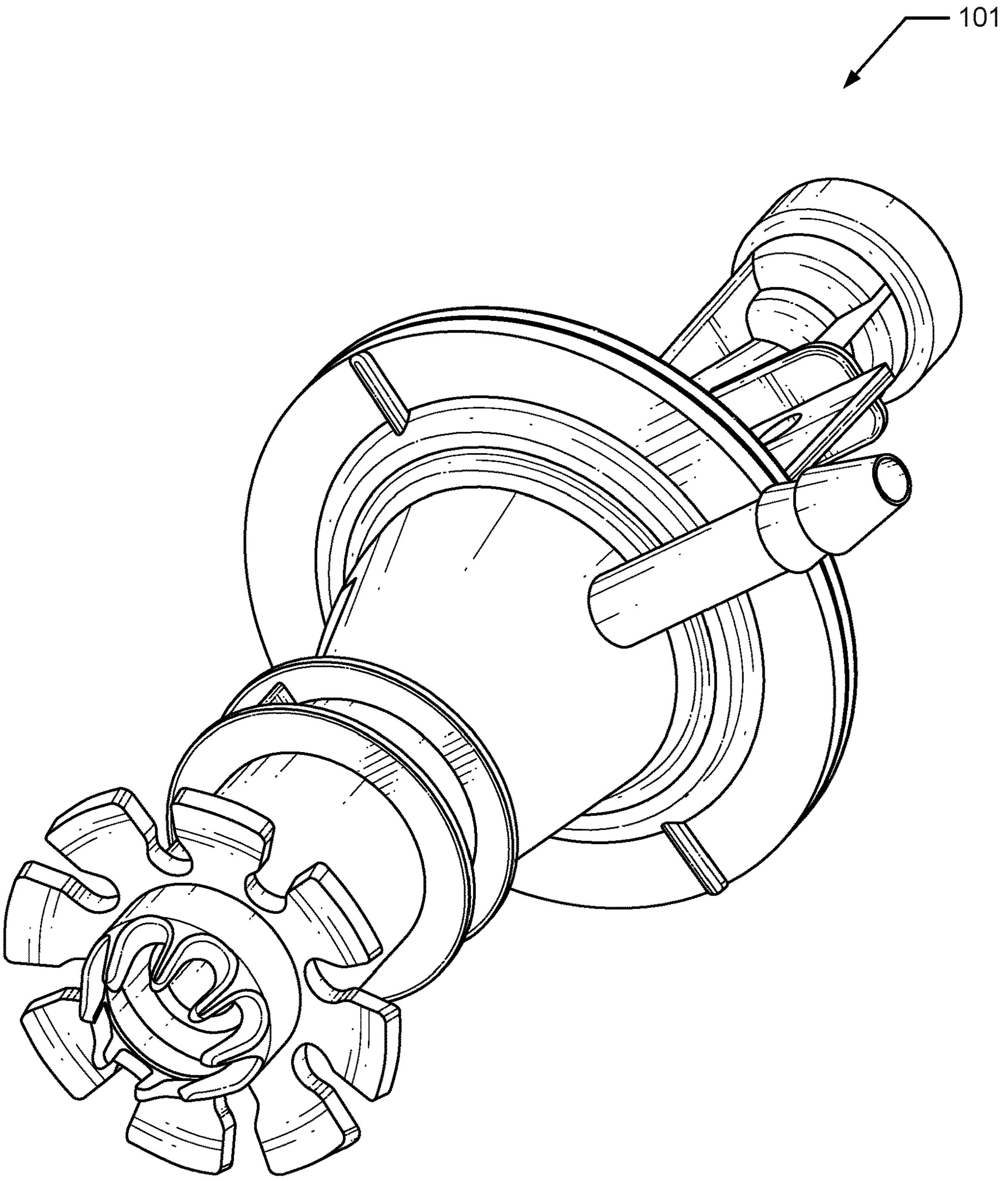
FIG. 11 shows a perspective view of an exemplary nozzle, according to one embodiment of the present disclosure.

FIG. 11 shows a perspective view of the nozzle 101, according to one embodiment of the present disclosure.

Figure 12:
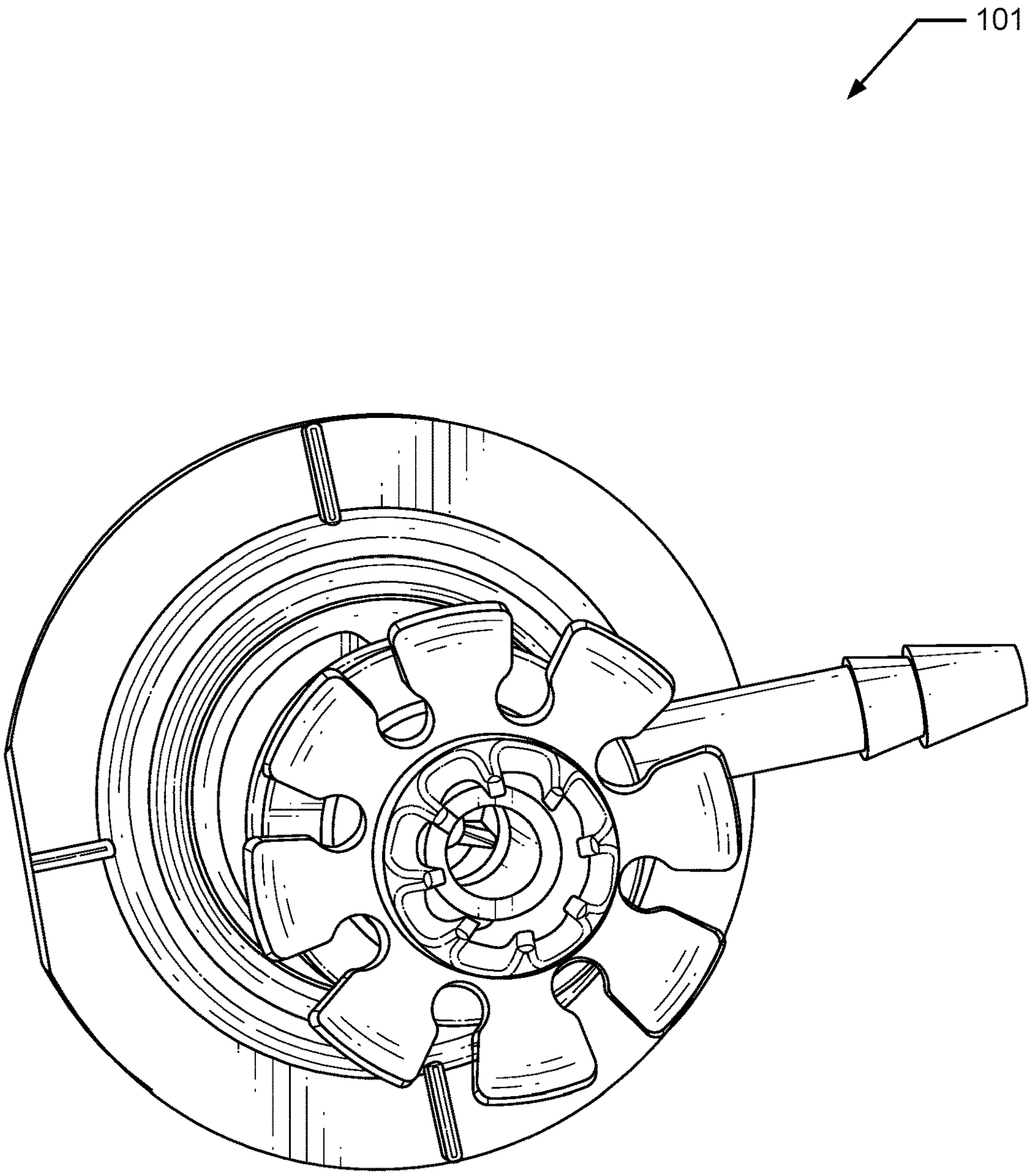
FIG. 12 shows a perspective view of an exemplary nozzle, according to one embodiment of the present disclosure.

FIG. 12 shows a perspective view of the nozzle 101, according to one embodiment of the present disclosure.

Figure 13:
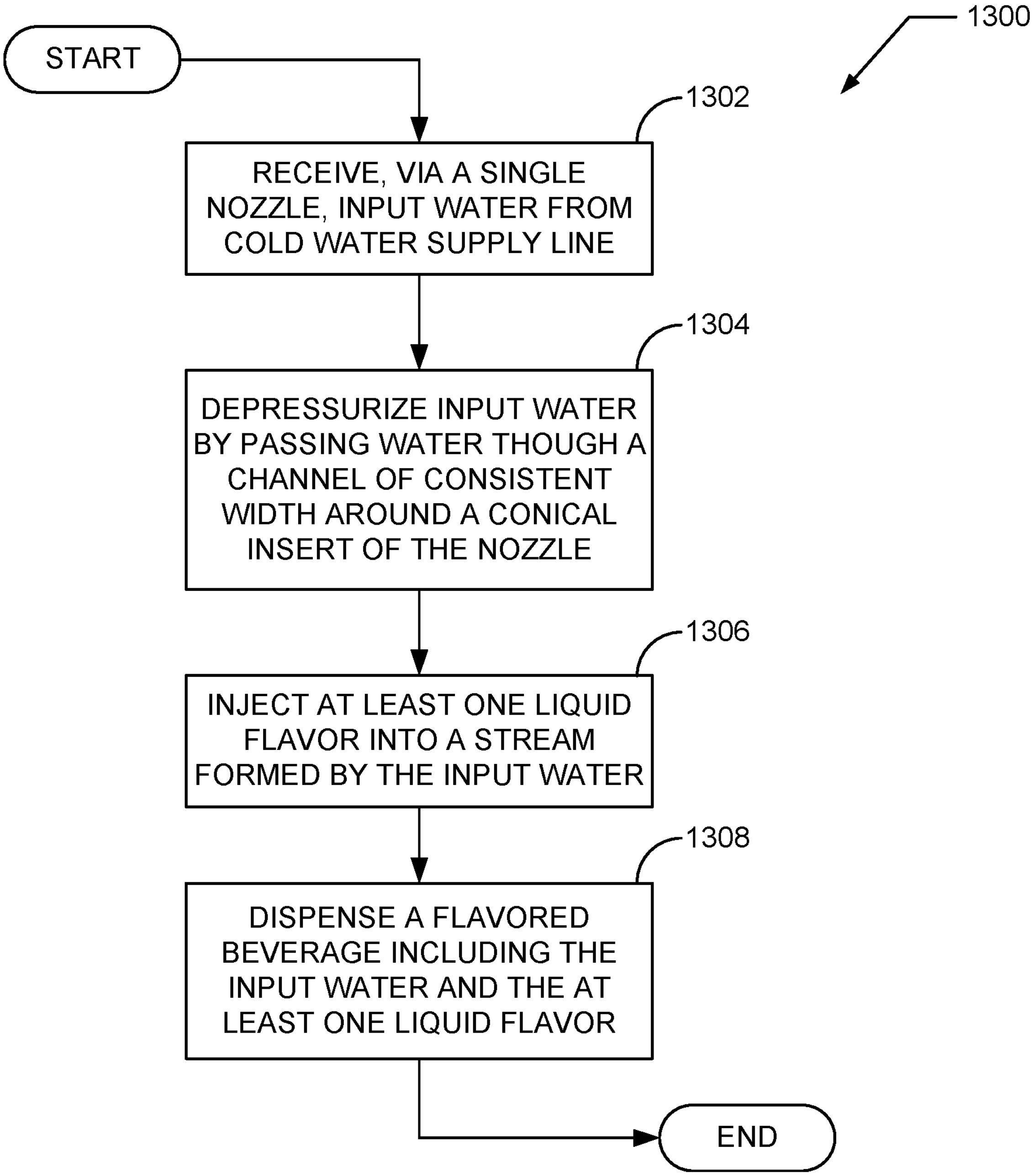
FIG. 13 is a flowchart of an exemplary cold water dispensing process, according to one embodiment of the present disclosure.

Turning now to FIG. 13, a flowchart of an exemplary cold water dispensing process 1300 is shown, according to one embodiment of the present disclosure. In at least one embodiment, the exemplary beverage dispensing systems discussed herein are operable to dispense a cold flavored beverage (e.g., a carbonated beverage, a still beverage, etc.), and steps for dispensing the cold flavored beverage are described in association with the process 1300 below. As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown. The various steps, processes, and operations shown in FIGS. 13-12 and described herein may be performed, or otherwise undertaken, by an embodiment of the beverage dispensing system 100 (see FIG. 1).

In particular embodiments, the process 1300 begins at step 1302, where the nozzle receives input water from a cold water supply line. According to various aspects of the present disclosure, the cold water supply line may attach to a hose mate, or another appropriate type of connector or receptacle, for receiving the water supply input line. The water from the water supply line may be received with a particular pressure (e.g., 10 psi, 20 psi, 50 psi, 75 psi, 100 psi, 120 psi, or another suitable pressure) controlled by a beverage dispensing system operatively connected to the nozzle, where the particular pressure is controlled by a water reservoir and pump configured to establish a fixed pressure.

In a certain embodiment, at step 1304, the nozzle depressurizes the input water by passing the water through a channel of consistent width around a conical insert of the nozzle. As is discussed throughout the present disclosure, the input water is gradually depressurized as it moves through the channel, and the water may then be received by a flow straightening funnel.

At step 1306, in one embodiment, one or more flavor lines of the nozzle inject at least one liquid flavor into a stream formed by the input water. In various embodiments, the stream formed by the input water includes the depressurized water after being manipulated into a tight and narrow stream via the conical insert and funnel. In certain embodiments, the one or more flavor lines may be positioned near the bottom of the nozzle (either within the nozzle, or on/around the nozzle exterior), and the injected flavor(s) may be selected by a user via a GUI at his/her mobile computing device, or via another GUI or flavor selection means.

Proceeding to step 1308, a flavored beverage is dispensed from the nozzle, where the flavored beverage includes the input water and the at least one liquid flavor. According to various aspects of the present disclosure, the at least one liquid flavor (e.g., flavor additive) mixes with the input water either prior to dispensing the input water from the nozzle, as the input water is being dispensed, or in response to dispensing the input water (e.g., the liquid flavor mixes as the flavor and input water are received in a container).

Figure 14:
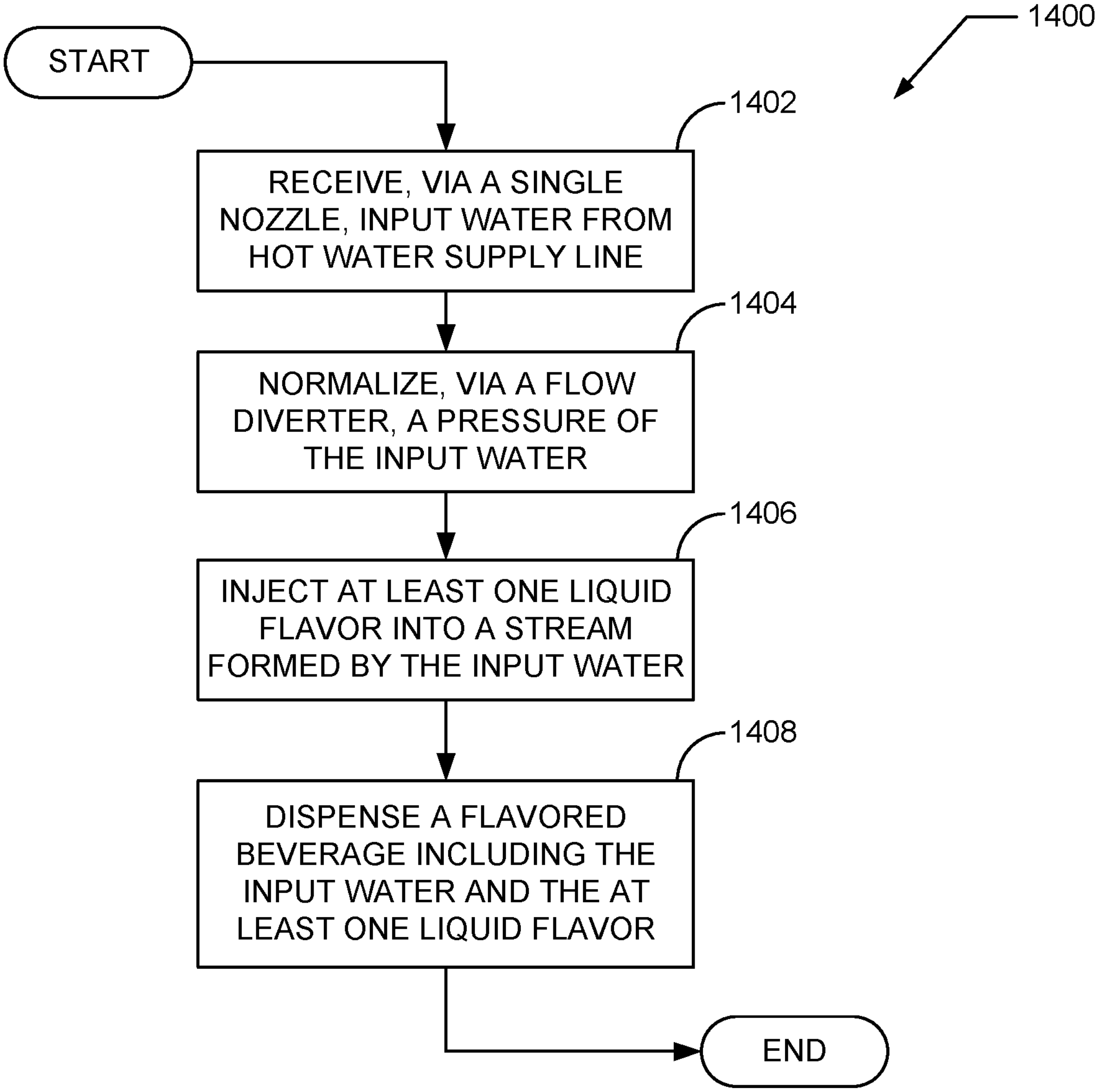
FIG. 14 is a flowchart of an exemplary hot water dispensing process, according to one embodiment of the present disclosure.

FIG. 14, in one embodiment, shows a flowchart of an exemplary hot water dispensing process 1400, according to one embodiment of the present disclosure. In at least one embodiment, the exemplary nozzle discussed herein is operable to also dispense a hot flavored beverage, and steps for dispensing the hot flavored beverage are described in association with the process 1400 below. While the processes for dispensing cold and hot beverages (processes 1300 and 1400, respectively) are discussed separately and may execute independently, the nozzle may allow for both cold and hot water to be dispensed simultaneously, thus creating a warm beverage or a beverage of a particular temperature (e.g., a user-selectable temperature). In particular embodiments, the process 1400 begins at step 1402, where the nozzle receives input water from a hot water supply line. According to various aspects of the present disclosure, the hot water supply line may attach to a hose mate, or another appropriate type of connector or receptacle, for receiving the water supply input line. The water from the water supply line may be received with a particular pressure controlled by a beverage dispensing system operatively connected to the nozzle, where the particular pressure is controlled by a water reservoir and pump configured to establish a fixed pressure.

In a certain embodiment, at step 1404, the nozzle normalizes the input water by passing the water through a flow diverter of the nozzle. As is discussed throughout the present disclosure, the input water from the hot water supply line is received from a horizontal direction, and the nozzle flow diverter(s) normalize the pressure and direction of the hot water for creating a downward stream from horizontally received water. In some embodiments, the hot water may be received from other directions (e.g., vertical, angled, etc.).

At step 1406, in one embodiment, one or more flavor lines of the nozzle inject at least one liquid flavor into a stream formed by the input water. In various embodiments, the stream formed by the input water includes the normalized water after being manipulated into a tight and narrow stream via the flow diverter(s). In certain embodiments, the one or more flavor lines may be positioned near the bottom of the nozzle (either within the nozzle, or on/around the nozzle exterior), and the injected flavor(s) may be selected by a user via a GUI at his/her mobile computing device, or via another GUI or flavor selection means.

Proceeding to step 1408, a flavored beverage is dispensed from the nozzle, where the flavored beverage includes the input water and the at least one liquid flavor. According to various aspects of the present disclosure, the at least one liquid flavor mixes with the input water either prior to dispensing the input water from the nozzle, as the input water is being dispensed, or in response to dispensing the input water (e.g., the liquid flavor mixes as the flavor and input water are received in a container).

According to a first aspect, a beverage dispensing nozzle, comprising: A) a first fluid inlet coupled to a first fluid source, the first fluid inlet configured to receive a first fluid from the first fluid source; B) a second fluid inlet coupled to a second fluid source, the second fluid inlet configured to receive a second fluid from the second fluid source with a temperature exceeding a temperature of the first fluid; C) a fluid outlet comprising a plurality of protrusions angled toward an axis of fluid flow, wherein each pair of the plurality of protrusions form a respective one of a plurality of apertures; D) a plurality of flavor dispensers, wherein each of the plurality of flavor dispensers is configured to dispense a respective flavor concentrate of a plurality of flavor concentrates; and E) a plurality of holsters aligned with the plurality of apertures, wherein each of the plurality of holsters is configured to retain a respective one of the plurality of flavor dispensers.

According to a further aspect, the beverage dispensing nozzle of the first aspect or any other aspect, wherein the first fluid inlet is parallel with a fluid flow direction of the fluid outlet and the second fluid inlet is perpendicular with the fluid flow direction of the fluid outlet.

According to a further aspect, the beverage dispensing nozzle of the first aspect or any other aspect, further comprising a nozzle casing comprising the second fluid inlet and a flow diverting pocket opposite the second fluid inlet.

According to a further aspect, the beverage dispensing nozzle of the first aspect or any other aspect, further comprising a double conical-shaped insert comprising a first end with a first diameter, a central portion with a second diameter, and a second end with a third diameter, wherein the second diameter exceeds the first diameter and the third diameter.

According to a further aspect, the beverage dispensing nozzle of the first aspect or any other aspect, further comprising a nozzle wall, wherein the first fluid inlet is aligned with the first end of the double conical-shaped insert and the beverage dispensing nozzle is configured to cause the first fluid to flow from the first end to the second end of the double conical-shaped insert in a cavity between the nozzle wall and the double conical-shaped insert.

According to a further aspect, the beverage dispensing nozzle of the first aspect or any other aspect, wherein the nozzle wall and the double conical-shaped insert form the cavity as an increasing inner diameter toroid between the first end and the central portion.

According to a further aspect, the beverage dispensing nozzle of the first aspect or any other aspect, wherein a distance between the nozzle wall and the double conical-shaped insert is consistent between the first end and the central portion.

According to a further aspect, the beverage dispensing nozzle of the first aspect or any other aspect, wherein the double conical-shaped insert comprises a plurality of fins protruding into the cavity between the central portion and the second end, the plurality of fins configured to guide a flow of fluid in the cavity.

According to a second aspect, a method for dispensing a fluid, comprising: A) receiving, at a cold fluid inlet of a beverage dispensing nozzle, a first fluid from a first fluid source; B) decreasing, via a cavity between a nozzle wall and a double conical-shaped insert of the beverage dispensing nozzle, a pressure of the first fluid; C) dispensing, via at least one of a plurality of flavor dispensers of the beverage dispensing nozzle, at least one flavor concentrate; and D) dispensing, via a fluid outlet of the beverage dispensing nozzle, a flavored beverage comprising the first fluid and the at least one flavor concentrate.

According to a further aspect, the method for dispensing a fluid of the second aspect or any other aspect, wherein the nozzle wall and the double conical-shaped insert form at least a portion of the cavity as an increasing inner diameter toroid and the method further comprising passing the first fluid through the portion of the cavity to decrease the pressure of the first fluid.

According to a further aspect, the method for dispensing a fluid of the second aspect or any other aspect, wherein a distance between the nozzle wall and the double conical-shaped insert comprises a consistent distance between a first end of the double conical-shaped insert and a central portion of the double conical-shaped insert, and the method further comprises preventing combination of carbon dioxide bubbles in the first fluid within the portion of the cavity based on the consistent distance.

According to a further aspect, the method for dispensing a fluid of the second aspect or any other aspect, further comprising receiving, at a hot fluid inlet of the beverage dispensing nozzle, a second fluid from a second fluid source, wherein the flavored beverage further comprises the second fluid and a temperature of the flavored beverage is between a temperature of the first fluid and a temperature of the second fluid.

According to a further aspect, the method for dispensing a fluid of the second aspect or any other aspect, further comprising depressurizing the second fluid via a flow diverter in a nozzle casing of the beverage dispensing nozzle.

According to a third aspect, a beverage dispensing nozzle apparatus, comprising: A) a double conical insert comprising a first conical portion and a second conical portion; B) a nozzle body comprising a conical wall forming a first cavity and comprising a cold fluid supply aperture at an apex, wherein the first conical portion of the double conical insert is configured to fit within the first cavity; C) an inner nozzle portion comprising a truncated cone shaped inner wall forming a second cavity, wherein the second conical portion of the double conical insert is configured to fit within the second cavity; and D) an outer nozzle portion comprising a wall structure forming a third cavity, wherein the inner nozzle portion is configured to fit within the third cavity.

According to a further aspect, the beverage dispensing nozzle apparatus of the third aspect or any other aspect, wherein the outer nozzle portion comprises a hot fluid supply aperture perpendicular to the cold fluid supply aperture and a depressurizing extended portion on a side opposite the hot fluid supply aperture.

According to a further aspect, the beverage dispensing nozzle apparatus of the third aspect or any other aspect, wherein the outer nozzle portion is configured to: A) receive a fluid from a fluid source through the hot fluid supply aperture; B) depressurize the fluid via the depressurizing extended portion; C) pass, via at least one of water pressure and gravity, the fluid through a channel in the third cavity between the wall structure and an outer surface of the inner nozzle portion; and D) dispense the fluid from a nozzle.

According to a further aspect, the beverage dispensing nozzle apparatus of the third aspect or any other aspect, wherein: A) the nozzle body and the first conical portion are configured to: 1) receive a fluid from a fluid source through the cold fluid supply aperture; 2) pass, via at least one of: water pressure and gravity, the fluid through a fixed width channel in the first cavity between the conical wall and an outer surface of the first conical portion of the double conical insert; and 3) output the water into the second cavity of the inner nozzle portion; and B) the inner nozzle portion and the second conical portion are configured to: 1) receive the fluid from the first cavity; 2) pass, via at least one of: water pressure and gravity, the fluid through a second channel in the second cavity between the truncated cone shaped inner wall and an outer surface of the second conical portion; and 3) output the fluid from a nozzle.

According to a further aspect, the beverage dispensing nozzle apparatus of the third aspect or any other aspect, wherein a side of the nozzle body opposite the cold fluid supply aperture is fluid tight affixed to the inner nozzle portion at a first radius and the side of the nozzle body is fluid tight affixed to the outer nozzle portion at a second radius, the first radius being less than the second radius.

According to a further aspect, the beverage dispensing nozzle apparatus of the third aspect or any other aspect, wherein: A) the inner nozzle portion comprises a first outer wall and a plurality of first fin shaped portions spaced evenly about a circumference of the first outer wall; and B) the second conical portion of the double conical insert comprises a second outer wall and a plurality of second fin shaped portions spaced evenly about a circumference of the second outer wall, wherein the plurality of first fin shaped portions are configured to prevent rotational movement of fluids in the third cavity and the plurality of second fin shaped portions are configured to prevent rotational movement of fluids in the second cavity.

According to a further aspect, the beverage dispensing nozzle apparatus of the third aspect or any other aspect, wherein the outer nozzle portion comprises a plurality of holsters protruding around a circumference of a nozzle portion of the outer nozzle portion. From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media that can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A beverage dispensing nozzle, comprising:
- a first fluid inlet coupled to a first fluid source, the first fluid inlet configured to receive a first fluid from the first fluid source;
- a second fluid inlet coupled to a second fluid source, the second fluid inlet configured to receive a second fluid from the second fluid source with a temperature exceeding a temperature of the first fluid;
- a fluid outlet comprising a plurality of protrusions angled toward an axis of fluid flow, wherein each pair of a plurality of pairs of the plurality of protrusions form a respective one of a plurality of apertures and the second fluid inlet is perpendicular with a fluid flow direction of the fluid outlet;
- a nozzle casing comprising the second fluid inlet and a flow diverting pocket opposite the second fluid inlet;
- a plurality of flavor dispensers, wherein each of the plurality of flavor dispensers is configured to dispense a respective flavor concentrate of a plurality of flavor concentrates; and
- a plurality of holsters aligned with the plurality of apertures, wherein each of the plurality of holsters is configured to retain a respective one of the plurality of flavor dispensers.

2. The beverage dispensing nozzle of claim 1, wherein the first fluid inlet is parallel with the fluid flow direction of the fluid outlet.

3. The beverage dispensing nozzle of claim 1, further comprising a double conical-shaped insert comprising a first end with a first diameter, a central portion with a second diameter, and a second end with a third diameter, wherein the second diameter exceeds the first diameter and the third diameter.

4. The beverage dispensing nozzle of claim 3, further comprising a nozzle wall, wherein the first fluid inlet is aligned with the first end of the double conical-shaped insert and the beverage dispensing nozzle is configured to cause the first fluid to flow from the first end to the second end of the double conical-shaped insert in a cavity between the nozzle wall and the double conical-shaped insert.

5. The beverage dispensing nozzle of claim 4, wherein the nozzle wall and the double conical-shaped insert form the cavity as an increasing inner diameter toroid between the first end and the central portion.

6. The beverage dispensing nozzle of claim 5, wherein a distance between the nozzle wall and the double conical-shaped insert is consistent between the first end and the central portion.

7. The beverage dispensing nozzle of claim 4, wherein the double conical-shaped insert comprises a plurality of fins protruding into the cavity between the central portion and the second end, the plurality of fins configured to guide a flow of fluid in the cavity.

8. A method for dispensing a fluid, comprising:
- receiving, at a cold fluid inlet of a beverage dispensing nozzle, a first fluid from a first fluid source;
- decreasing, via a first cavity between a nozzle wall and a double conical-shaped insert of the beverage dispensing nozzle, a pressure of the first fluid, wherein the double conical-shaped insert comprises a first conical portion and a second conical portion, and an inner nozzle portion comprises a truncated cone shaped inner wall forming a second cavity, wherein the second conical portion of the double conical insert is configured to fit within the second cavity;

dispensing, via at least one of a plurality of flavor dispensers of the beverage dispensing nozzle, at least one flavor concentrate; and dispensing, via a fluid outlet of the beverage dispensing nozzle, a flavored beverage comprising the first fluid and the at least one flavor concentrate.

9. The method of claim 8, wherein the nozzle wall and the double conical-shaped insert form at least a portion of the first cavity as an increasing inner diameter toroid and the method further comprising passing the first fluid through the portion of the first cavity to decrease the pressure of the first fluid.

10. The method of claim 9, wherein a distance between the nozzle wall and the double conical-shaped insert comprises a consistent distance between a first end of the double conical-shaped insert and a central portion of the double conical-shaped insert, and the method further comprises preventing combination of carbon dioxide bubbles in the first fluid within the portion of the first cavity based on the consistent distance.

11. The method of claim 8, further comprising receiving, at a hot fluid inlet of the beverage dispensing nozzle, a second fluid from a second fluid source, wherein the flavored beverage further comprises the second fluid and a temperature of the flavored beverage is between a temperature of the first fluid and a temperature of the second fluid.

12. The method of claim 11, further comprising depressurizing the second fluid via a flow diverter in a nozzle casing of the beverage dispensing nozzle.

13. A beverage dispensing nozzle apparatus, comprising:

a double conical insert comprising a first conical portion and a second conical portion;

a nozzle body comprising a conical wall forming a first cavity and comprising a cold fluid supply aperture at an apex, wherein the first conical portion of the double conical insert is configured to fit within the first cavity;

an inner nozzle portion comprising a truncated cone shaped inner wall forming a second cavity, wherein the second conical portion of the double conical insert is configured to fit within the second cavity; and an outer nozzle portion comprising a wall structure forming a third cavity, wherein the inner nozzle portion is configured to fit within the third cavity.

14. The beverage dispensing nozzle apparatus of claim 13, wherein the outer nozzle portion comprises a hot fluid supply aperture perpendicular to the cold fluid supply aperture and a depressurizing extended portion on a side opposite the hot fluid supply aperture.

15. The beverage dispensing nozzle apparatus of claim 14, wherein the outer nozzle portion is configured to:

receive a fluid from a fluid source through the hot fluid supply aperture;

depressurize the fluid via the depressurizing extended portion;

pass, via at least one of water pressure and gravity, the fluid through a channel in the third cavity between the wall structure and an outer surface of the inner nozzle portion; and dispense the fluid from a nozzle.

16. The beverage dispensing nozzle apparatus of claim 13, wherein:

the nozzle body and the first conical portion are configured to:

receive a fluid from a fluid source through the cold fluid supply aperture;

pass, via at least one of: water pressure and gravity, the fluid through a fixed width channel in the first cavity between the conical wall and an outer surface of the first conical portion of the double conical insert; and output water into the second cavity of the inner nozzle portion; and the inner nozzle portion and the second conical portion are configured to:

receive the fluid from the first cavity;

pass, via at least one of: water pressure and gravity, the fluid through a second channel in the second cavity between the truncated cone shaped inner wall and an outer surface of the second conical portion; and output the fluid from a nozzle.

17. The beverage dispensing nozzle apparatus of claim 13, wherein a side of the nozzle body opposite the cold fluid supply aperture is fluid tight affixed to the inner nozzle portion at a first radius and the side of the nozzle body is fluid tight affixed to the outer nozzle portion at a second radius, the first radius being less than the second radius.

18. The beverage dispensing nozzle apparatus of claim 13, wherein:

the inner nozzle portion comprises a first outer wall and a plurality of first fin shaped portions spaced evenly about a circumference of the first outer wall; and the second conical portion of the double conical insert comprises a second outer wall and a plurality of second fin shaped portions spaced evenly about a circumference of the second outer wall, wherein the plurality of first fin shaped portions are configured to prevent rotational movement of fluids in the third cavity and the plurality of second fin shaped portions are configured to prevent rotational movement of fluids in the second cavity.

19. The beverage dispensing nozzle apparatus of claim 13, wherein the outer nozzle portion comprises a plurality of holsters protruding around a circumference of a nozzle portion of the outer nozzle portion.

* * * * *